US012760566B2

(12) United States Patent
Hiramoto et al.

(10) Patent No.: US 12,760,566 B2
(45) Date of Patent: Oct. 13, 2026

(54) ACTUATOR DEVICE AND VEHICLE DOOR LOCK DEVICE

(71) Applicant: MITSUI KINZOKU ACT CORPORATION, Yokohama (JP)

(72) Inventors: Shigenori Hiramoto, Yokohama (JP); Masazumi Miyagawa, Yokohama (JP)

(73) Assignee: HI-LEX ACT CORPORATION, Yokohama (JP)

(*) Notice: Subject to any disclaimer, the term of this patent is extended or adjusted under 35 U.S.C. 154(b) by 0 days.

(21) Appl. No.: 19/171,938

(22) Filed: Apr. 7, 2025

(65) Prior Publication Data

US 2026/0160098 A1 Jun. 11, 2026

(30) Foreign Application Priority Data

Apr. 10, 2024 (JP) ................................ 2024-063121

(51) Int. Cl.

*E05B 81/16* (2014.01)
*E05B 81/06* (2014.01)
*E05B 81/30* (2014.01)
*E05B 81/34* (2014.01)
*E05B 81/42* (2014.01)
*E05B 81/90* (2014.01)

(52) U.S. Cl.

CPC .............. *E05B 81/16* (2013.01); *E05B 81/06* (2013.01); *E05B 81/30* (2013.01); *E05B 81/34* (2013.01); *E05B 81/42* (2013.01); *E05B 81/90* (2013.01)

(58) Field of Classification Search

CPC .......... E05B 81/16; E05B 81/06; E05B 81/30; E05B 81/34; E05B 81/42; E05B 81/90; E05B 81/50; E05B 81/14; E05B 81/36; E05B 81/44; E05B 81/56

USPC ........................................................... 70/277

See application file for complete search history.

(56) References Cited

U.S. PATENT DOCUMENTS

| | | | | |
|---|---|---|---|---|
| 10,697,210 | B2 * | 6/2020 | Hiramoto | E05B 81/90 |
| 11,414,898 | B2 * | 8/2022 | Okuyama | E05B 81/20 |
| 11,840,868 | B2 * | 12/2023 | Hayashi | E05B 81/16 |
| 11,859,418 | B2 * | 1/2024 | Okawa | E05B 81/50 |
| 11,891,841 | B2 * | 2/2024 | Hiramoto | E05B 81/16 |
| 12,060,735 | B2 * | 8/2024 | Hiramoto | E05B 83/40 |
| 12,129,690 | B2 * | 10/2024 | Nam | E05B 81/90 |
| 12,264,514 | B2 * | 4/2025 | Sanchez Rojas | E05B 81/30 |

(Continued)

FOREIGN PATENT DOCUMENTS

| | | | | |
|---|---|---|---|---|
| CN | 109415911 A | * | 3/2019 | E05B 81/14 |
| JP | 2009263910 A | * | 11/2009 | E05B 77/28 |

(Continued)

*Primary Examiner* — Steven A Tullia

(74) *Attorney, Agent, or Firm* — NIXON & VANDERHYE

(57) ABSTRACT

An actuator device having a two-way actuation member acting in first and second different directions by a motive power of a single driving actuator is provided with a first operation mechanism that performs a first operation by the actuation in the first direction, and a second operation mechanism that performs a second operation by the actuation in the second direction, the second operation mechanism including a cooperation mechanism that acts by the actuation of the two-way operation member and a switching member that moves between first and second different positions by transmitting of the actuation of the cooperation mechanism.

16 Claims, 23 Drawing Sheets

(56) References Cited

U.S. PATENT DOCUMENTS

| | | | | |
|---|---|---|---|---|
| 12,492,581 | B2 * | 12/2025 | Sanchez Rojas | E05B 81/90 |
| 12,577,813 | B2 * | 3/2026 | Taurasi | E05B 77/26 |
| 12,590,474 | B2 * | 3/2026 | Rojas | E05B 81/06 |
| 2002/0056996 | A1 * | 5/2002 | Fukunaga | E05B 77/28 292/216 |
| 2004/0119296 | A1 * | 6/2004 | Hayakawa | E05B 81/06 292/216 |
| 2020/0332570 | A1 * | 10/2020 | Tomaszewski | E05B 81/34 |
| 2022/0251886 | A1 * | 8/2022 | Tamura | E05B 81/42 |
| 2026/0028860 | A1 * | 1/2026 | Zillert | E05B 81/14 |
| 2026/0049506 | A1 * | 2/2026 | Okuyama | E05B 81/06 |

FOREIGN PATENT DOCUMENTS

| | | | | |
|---|---|---|---|---|
| JP | 2020143423 | A | 9/2020 | |
| WO | WO-2025211143 | A1 * | 10/2025 | E05B 81/42 |

* cited by examiner

ACTUATOR DEVICE AND VEHICLE DOOR LOCK DEVICE

CROSS-REFERENCE TO RELATED APPLICATIONS

This application claims benefit of the benefit of previously filed JP Application No. 2024-063121 which was filed on Apr. 10, 2024, which is incorporated herein by reference in its entirety.

FIELD OF THE INVENTION

The present invention relates to an actuator device and a vehicle door lock device comprising the actuator device, particularly to an actuator device having a relatively small and simple structure and activating two different operation mechanisms by a single driving actuator and a vehicle door lock device comprising the actuator device, the vehicle door lock device having a relatively small and simple structure and activating to release engagement of an engagement mechanism and activating to switch an actuation state of a locking/unlocking mechanism between locked and unlocked states or to switch a shift of the actuation state of the locking/unlocking mechanism between ineffective and effective states by a single driving actuator.

BACKGROUND OF THE INVENTION

This section provides background information related to a vehicle door lock device and is not necessarily prior art to the vehicle door lock device of the present disclosure.

Conventionally, a vehicle door latch device of an electric releasing type in which a releasing actuation of a vehicle door is performed by a motive power of a driving actuator such as a motor includes an engagement mechanism that holds the door in a closed position by engaging with a striker on a vehicle body side, a manual release mechanism that releases the engagement of the engagement mechanism by a manual operation force, a locking/unlocking mechanism shifting between a locked state in which an actuation of the manual release mechanism cannot be transmitted to the engagement mechanism such that the releasing of the engagement of the engagement mechanism is ineffective and an unlocked state in which the actuation of the manual release mechanism can be transmitted to the engagement mechanism such that the releasing of the engagement of the engagement mechanism is effective, and an electric release mechanism that releases the engagement of the engagement mechanism by the motive power of the driving actuator. In the case of releasing the door electrically, an output portion of an actuator mechanism part is actuated by the motive power of the driving actuator of the actuator mechanism part and is made to abut against an input portion on the engagement mechanism side to release the engagement of the engagement mechanism.

It has been proposed a vehicle door latch device of an electric releasing type capable of activating each of an electric release mechanism and a locking/unlocking mechanism by a single driving actuator. For example, JP 2020-143423 A proposes a vehicle door latch device including an engagement mechanism, an electric release mechanism and a locking/unlocking mechanism, wherein the electric release mechanism has a rotation cam that rotates in a forward direction or a backward direction from a reference position against a biasing force of a spring by a motive power of a motor and then can return to the reference position by the biasing force of the spring, the rotation cam being provided with a cam portion to rotate an open lever for activating a ratchet lever to release engagement of the engagement mechanism and a plurality of engagement portions to activate the locking/unlocking mechanism, and wherein the locking/unlocking mechanism has an active lever that does not restrict a rotation angle in the forward direction of the rotation cam when the locking/unlocking mechanism is in a locked state and restricts the rotation angle in the forward direction of the rotation cam within predetermined angle when the locking/unlocking mechanism is in a unlocked state.

The electric release mechanism of the device described in JP 2020-143423 A (1) releases the engagement of the engagement mechanism by rotating the rotation cam in the forward direction by an angle larger than the predetermined angle when the locking/unlocking mechanism is in the locked state, (2) switches the locking/unlocking mechanism from the locked state to the unlocked state by rotating the rotation cam in the backward direction when the locking/unlocking mechanism is in the locked state, and (3) switches the locking/unlocking mechanism from the unlocked state to the locked state by rotating the rotation cam in the forward direction by the predetermined angle when the locking/unlocking mechanism is in the unlocked state.

SUMMARY OF THE INVENTION

The present invention provides an actuator device having a relatively small and simple structure and activating two different operation mechanisms by a single driving actuator. This device has a configuration that a two-way actuation member acting in first and second different directions by a motive power of a single driving actuator is provided with a first operation mechanism that performs a first operation by the actuation in the first direction, and a second operation mechanism that performs a second operation by the actuation in the second direction, the second operation mechanism including a cooperation mechanism that acts by the actuation of the two-way operation member and a switching member that moves between first and second different positions by transmitting of the actuation of the cooperation mechanism.

Further, the present invention provides a vehicle door lock device having a relatively small and simple structure, and activating to release engagement of an engagement mechanism and activating to switch an actuation state of a locking/unlocking mechanism between locked and unlocked states or to switch a shift of the actuation state of the locking/unlocking mechanism between ineffective and effective states by a single driving actuator. This device has a configuration that the above-described actuator device is applied such that the above-described first operation mechanism is used as an electric release mechanism and the above-described second operation mechanism is used as an electric switching mechanism activating a locking/unlocking mechanism.

Thus, an actuator device according to the present invention, acting in two directions by a single driving actuator, comprising:

- a two-way actuation member that acts in first and second different directions respectively against a biasing force of a return biasing member, by a motive power of the driving actuator, with a neutral position where the two-way actuation member is held by the return biasing member as a reference position, a first operation mechanism that performs a first operation by the actuation of the two-way actuating member in the first direction, and a second operation mechanism that performs a second operation different from the first operation by the actuation of the two-way actuating member in the second direction, the second operation mechanism including a cooperation mechanism that acts by the actuation of the two-way operation member and a switching member that moves between first and second different positions by transmitting of the actuation of the cooperation mechanism, wherein when the two-way actuation member actuates the first operation mechanism, the two-way actuation member acts in the first direction from the reference position against the biasing force of the return biasing member, by the motive power of the driving actuator, to actuate the first operation mechanism, and then acts to return to the reference position by the biasing force of the return biasing member, and wherein when the two-way actuation member actuates the second operation mechanism, the two-way actuation member performs the following first and second switching operations:

the first switching operation in which the two-way actuation member acts in the second direction from the reference position against the biasing force of the return biasing member, by the motive power of the driving actuator, to switch the switching member from the first position to the second position via the cooperation mechanism, then acts to return to the reference position by the biasing force of the return biasing member, and the second switching operation in which the two-way actuation member acts in the second direction from the reference position against the biasing force of the return biasing member, by the motive power of the driving actuator, to switch the switching member from the second position to the first position via the cooperation mechanism, then acts to return to the reference position by the biasing force of the return biasing member, thereby switching the switching member between the first and second positions.

A vehicle door lock device of the present invention, comprising the actuator device of the present invention, comprising:

an engagement mechanism holding a door in a closed position by engaging with a striker provided on a vehicle body of a vehicle, a manual release mechanism releasing the engagement of the engagement mechanism by a manual operation force, and a locking/unlocking mechanism in which an actuation state is switched between a locked state in which an actuation of the manual release mechanism cannot be transmitted to the engagement mechanism such that the engagement of the engagement mechanism cannot be released and an unlocked state in which the actuation of the manual release mechanism can be transmitted to the engagement mechanism such that the engagement of the meshing mechanism can be released, wherein an electric release mechanism releasing the engagement of the engagement mechanism by the motive power of the driving actuator is provided as the first operation mechanism of the actuator device, wherein an electric switching mechanism activated by the motive power of the driving actuator common to the electric release mechanism is provided as the second operation mechanism of the actuator device, the electric switching mechanism having a first switching function to switch the actuation state of the locking/unlocking mechanism between the locked and unlocked states or a second switching function to switch the actuation state of the locking/unlocking mechanism between ineffective and effective states, wherein the electric release mechanism and the electric switching mechanism are provided with a rotation member that is common to both of the mechanisms as the two-way actuation member of the actuator device, the rotation member being supported by a rotation shaft to be configured to rotate in each of a first rotation direction that is either one of forward and backward directions and a second rotation direction that is opposite to the first rotation direction, from the reference position, against the biasing force of the return biasing member, by the motive power of the driving actuator, wherein the electric switching mechanism has a cooperation mechanism acting by the rotation of the rotation member in the second rotation direction as the cooperation mechanism of the actuator device, and has a switching member moving between first and second different positions by transmitting of the actuation of the cooperation mechanism as the switching member of the actuator device, wherein when the electric release mechanism is activated, the rotation member acts to rotate in the first rotation direction against the biasing force of the return biasing member, by the motive power of the driving actuator, to release the engagement of the engagement mechanism, and then acts to return to the reference position by the biasing force of the return biasing member, and wherein when the electric switching mechanism is activated, the rotation member performs the following first and second switching operations:

the first switching operation in which the rotation member acts to rotate in the second direction from the reference position against the biasing force of the return biasing member, by the motive power of the driving actuator, to switch the switching member from the first position to the second position via the cooperation mechanism, then acts to return to the reference position by the biasing force of the return biasing member, and the second switching operation in which the rotation member acts to rotate in the second direction from the reference position against the biasing force of the return biasing member, by the motive power of the driving actuator, to switch the switching member from the second position to the first position via the cooperation mechanism, then acts to return to the reference position by the biasing force of the return biasing member, thereby switching the actuation state of the locking/unlocking mechanism between the locked and unlocked states or switching a shift of the actuation state of the locking/unlocking mechanism between the ineffective and effective states, by switching the switching member between the first and second positions.

According to the present invention, since an actuator device having a two-way actuation member acting in first and second different directions by a motive power of a single driving actuator is provided with a first operation mechanism that performs a first operation by the actuation in the first direction, and a second operation mechanism that performs a second operation by the actuation in the second direction, the second operation mechanism including a cooperation mechanism that acts by the actuation of the two-way operation member and a switching member that moves between first and second different positions by transmitting of the actuation of the cooperation mechanism, it is possible to perform only the operation on the first operation mechanism in the actuation in the first direction and only the operation on the second operation mechanism requiring the switching actuation in the actuation in the second direction, and it is not necessary to separately perform the operation on the second operation mechanism requiring the switching actuation, in the first and second directions. Therefore, it is possible to obtain an actuator device having a relatively small and simple structure and activating two different operation mechanisms by a single driving actuator.

Further, since the above-described actuator device is applied to a vehicle door lock device such that the above-described first operation mechanism is used as an electric release mechanism and the above-described second operation mechanism is used as an electric switching mechanism activating a locking/unlocking mechanism, it is possible to perform only the operation on the engagement mechanism in the actuation in the first direction and only the operation on the locking/unlocking mechanism requiring the switching actuation in the actuation in the second direction, and it is not necessary to separately perform the operation on the locking/unlocking mechanism requiring the switching actuation, in the first and second directions. Therefore, it is possible to obtain a vehicle door lock device having a relatively small and simple structure, and activating to release engagement of the engagement mechanism and activating to switch an actuation state of the locking/unlocking mechanism between locked and unlocked states or to switch a shift of the actuation state of the locking/unlocking mechanism between ineffective and effective states by a single driving actuator.

EMBODIMENTS OF THE INVENTION

Figure 1:
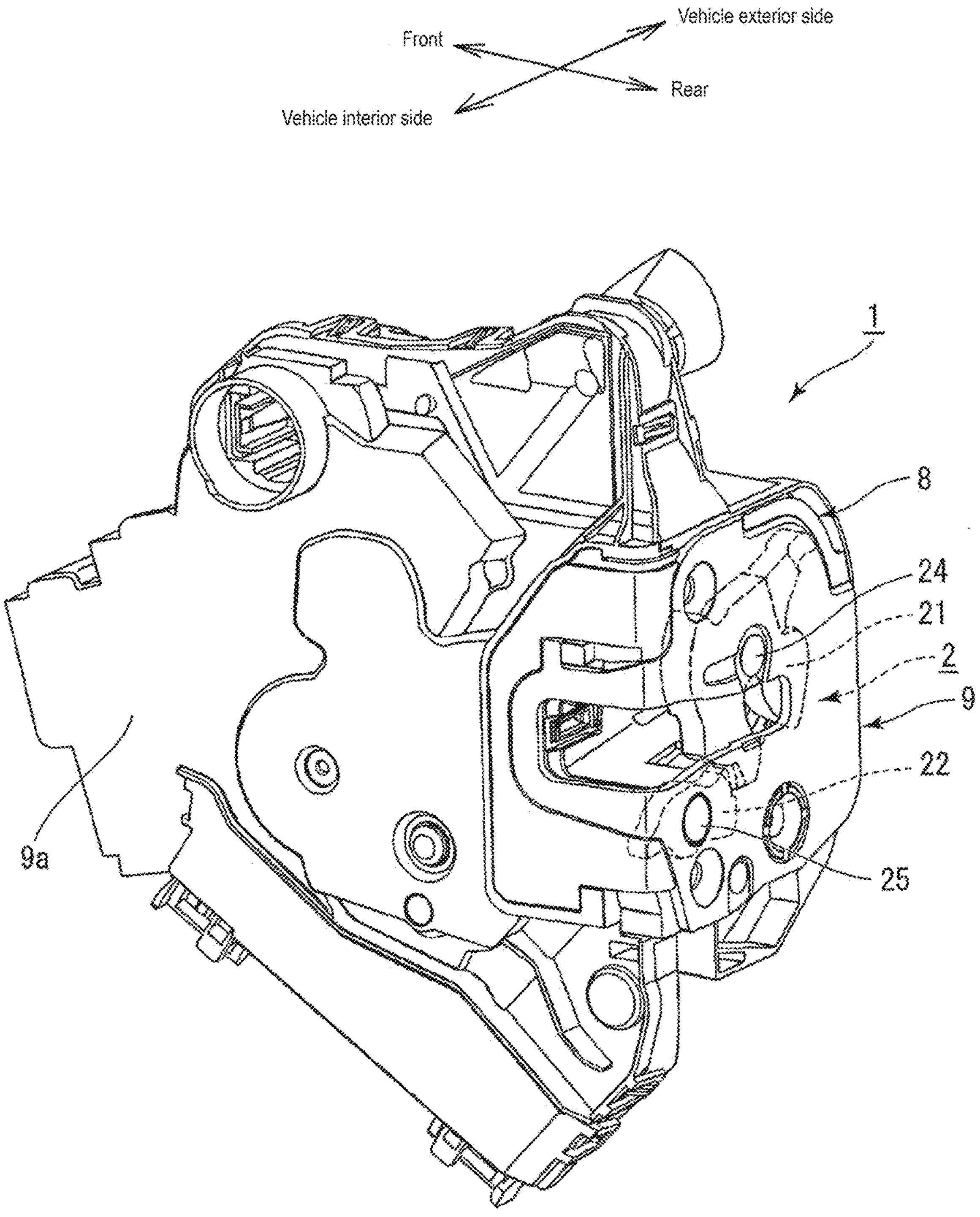
FIG. 1 is a perspective view showing a vehicle door lock device according to an embodiment of the present invention.

An actuator device according to the present invention, acting in two directions by a single driving actuator, comprising:

- a two-way actuation member that acts in first and second different directions respectively against a biasing force of a return biasing member, by a motive power of the driving actuator, with a neutral position where the two-way actuation member is held by the return biasing member as a reference position,
- a first operation mechanism that performs a first operation by the actuation of the two-way actuating member in the first direction, and
- a second operation mechanism that performs a second operation different from the first operation by the actuation of the two-way actuating member in the second direction, the second operation mechanism including a cooperation mechanism that acts by the actuation of the two-way operation member and a switching member that moves between first and second different positions by transmitting of the actuation of the cooperation mechanism, wherein when the two-way actuation member actuates the first operation mechanism, the two-way actuation member acts in the first direction from the reference position against the biasing force of the return biasing member, by the motive power of the driving actuator, to actuate the first operation mechanism, and then acts to return to the reference position by the biasing force of the return biasing member, and wherein when the two-way actuation member actuates the second operation mechanism, the two-way actuation member performs the following first and second switching operations:

the first switching operation in which the two-way actuation member acts in the second direction from the reference position against the biasing force of the return biasing member, by the motive power of the driving actuator, to switch the switching member from the first position to the second position via the cooperation mechanism, then acts to return to the reference position by the biasing force of the return biasing member, and the second switching operation in which the two-way actuation member acts in the second direction from the reference position against the biasing force of the return biasing member, by the motive power of the driving actuator, to switch the switching member from the second position to the first position via the cooperation mechanism, then acts to return to the reference position by the biasing force of the return biasing member, thereby switching the switching member between the first and second positions.

In the actuator device of the present invention, since by providing the configuration in which the first operation is performed by the actuation of the two-way actuation member in the first direction, and the second operation moving the switching member between the first and second positions is performed by the actuation of the two-way actuation member in the second direction, it is possible to perform only the operation on the first operation mechanism in the actuation in the first direction and only the operation on the second operation mechanism requiring the switching actuation in the actuation in the second direction, it is not necessary to separately perform the operation on the second operation mechanism requiring the switching actuation, in the first and second directions, and thereby enabling the structure to be simplified and the device to be downsized.

In a preferred example of the present invention, the two-way actuation member is a rotation member supported by a rotation shaft to be configured to rotate in each of a first rotation direction that is either one of forward and backward directions and a second rotation direction that is opposite to the first rotation direction, from the reference position, against the biasing force of the return biasing member, by the motive power of the driving actuator, wherein the first operation mechanism is provided with an operation member performing the first operation, the operation member being pivotably supported by a pivot shaft and pivoting by pressing with a cam portion provided on the rotation member when the rotation member rotates in the first rotation direction, wherein the cooperation mechanism of the second operation mechanism acts by the rotation in the second rotation direction of the rotation member and comprises an operation portion provided on the rotation member and a transmission member that is configured to engage with or disengage from the operation portion, the transmission member moving from a standby position to a linkage position when the rotation member rotates in the second rotation direction and moving from the linkage position to the standby position when the rotation member returns to the reference position, and wherein when the second operation mechanism is actuated, the rotation member performs the following first and second switching operations:

the first switching operation in which the rotation member rotates in the second rotation direction from the reference position and moves the transmission member from the standby position to the linkage position by the operation portion to switch the switching member from the first position to the second position, then returns to the reference position by the biasing force of the return biasing member, and the second switching operation in which the rotation member rotates in the second rotation direction from the reference position and moves the transmission member from the linkage position to the standby position by the operation portion to switch the switching member from the second position to the first position, then returns to the reference position by the biasing force of the return biasing member, thereby switching the switching member between the first and second positions.

In a more preferred example of the present invention, the cam portion is provided on a first rotational surface that is one rotational surface of the rotation member, and the operation member is disposed in the first rotational surface side of the rotation member, and wherein the operation portion is provided on a second rotational surface that is the other rotational surface of the rotation member, the transmission member is disposed such that a part of the transmission member overlaps the second rotational surface to be configured to engage with or disengage from the operation portion, and the switching member is disposed in the second rotational surface side.

Since by providing the configuration in which the operation member is disposed in the first rotational surface side and the switching member is disposed in the second rotational surface side as described above, the first and second operations can be performed by the single rotation member, and thereby enabling the structure to be simplified and the device to be downsized. Moreover, since by providing the configuration in which a part of the transmission member is disposed to overlap the rotational surface of the rotation member to be supported by the operation portion provided on the rotation member it is not necessary to provide a structure for pivotally supporting the transmission member by a shaft, and it is possible to provide a configuration in which the driving force of the driving actuator is surely transmitted to the switching member by the transmission member while simplifying the structure. Furthermore, since by providing the configuration in which the transmission member is disposed to overlap the rotation member, a target of the second operation and the rotation member can be brought close to each other, and thereby enabling the device to be downsized.

In another preferred example of the present invention, the second operation mechanism has a mechanical cam mechanism comprising gear-shaped first and second cam members that are coaxially provided to integrally rotate, the mechanical cam mechanism being provided between the cooperation mechanism and the switching member, wherein the first cam member has a plurality of engagement teeth that extend radially outward from a rotation center thereof, and the plurality of engagement teeth sequentially mesh with an engaged portion provided on the switching member in accordance with the rotation of the first cam member to move the switching member between the first and second positions, and wherein the second cam member has a plurality of engagement teeth radially extending outward from a rotation center thereof, the plurality of engagement teeth are spaced apart from the transmission member when the transmission member is in the standby position, and are configured to be engaged with and pressed by a cam pressing portion provided on the transmission member to integrally rotate the first and second cam members when the transmission member moves from the standby position to the linkage position.

In still another preferred example of the present invention, each engagement tooth of the first cam member has a tongue piece shape in a rotational surface view, a tip portion of each of the engagement teeth is formed with a first step portion for locking the engaged portion of the switching member, and a bottom portion of each inter-tooth recess portion of the first cam member is formed with a second step portion for locking the engaged portion of the switching member, and wherein each engagement tooth of the second cam member has a mountain shape in a rotational surface view and has a smaller tooth width than each of the engagement teeth of the first cam member, the number of teeth of the second cam member is twice the number of teeth of the first cam member, and the first and second cam members are arranged in an overlapping manner such that the alternately formed engagement teeth and inter-tooth recesses of the first cam member are alternately arranged with respect to the plurality of engagement teeth of the second cam member.

Since by providing the configuration in which each of the engagement teeth of the second cam member has a smaller tooth width than each of the engagement teeth of the first cam member and has a mountain shape in the rotational surface view as described above, the transmission member can move from the linkage position to the standby position without interfering with the second cam member after pressing the second cam member, and therefore, the first and second operations can be realized in a space-saving manner and the device can be downsized.

A vehicle door lock device of the present invention, comprising the actuator device of the present invention, comprising:

an engagement mechanism holding a door in a closed position by engaging with a striker provided on a vehicle body of a vehicle, a manual release mechanism releasing the engagement of the engagement mechanism by a manual operation force, and a locking/unlocking mechanism in which an actuation state is switched between a locked state in which an actuation of the manual release mechanism cannot be transmitted to the engagement mechanism such that the engagement of the engagement mechanism cannot be released and an unlocked state in which the actuation of the manual release mechanism can be transmitted to the engagement mechanism such that the engagement of the meshing mechanism can be released, wherein an electric release mechanism releasing the engagement of the engagement mechanism by the motive power of the driving actuator is provided as the first operation mechanism of the actuator device, wherein an electric switching mechanism activated by the motive power of the driving actuator common to the electric release mechanism is provided as the second operation mechanism of the actuator device, the electric switching mechanism having a first switching function to switch the actuation state of the locking/unlocking mechanism between the locked and unlocked states or a second switching function to switch the actuation state of the locking/unlocking mechanism between ineffective and effective states, wherein the electric release mechanism and the electric switching mechanism are provided with a rotation member that is common to both of the mechanisms as the two-way actuation member of the actuator device, the rotation member being supported by a rotation shaft to be configured to rotate in each of a first rotation direction that is either one of forward and backward directions and a second rotation direction that is opposite to the first rotation direction, from the reference position, against the biasing force of the return biasing member, by the motive power of the driving actuator, wherein the electric switching mechanism has a cooperation mechanism acting by the rotation of the rotation member in the second rotation direction as the cooperation mechanism of the actuator device, and has a switching member moving between first and second different positions by transmitting of the actuation of the cooperation mechanism as the switching member of the actuator device, wherein when the electric release mechanism is activated, the rotation member acts to rotate in the first rotation direction against the biasing force of the return biasing member, by the motive power of the driving actuator, to release the engagement of the engagement mechanism, and then acts to return to the reference position by the biasing force of the return biasing member, and wherein when the electric switching mechanism is activated, the rotation member performs the following first and second switching operations:

the first switching operation in which the rotation member acts to rotate in the second direction from the reference position against the biasing force of the return biasing member, by the motive power of the driving actuator, to switch the switching member from the first position to the second position via the cooperation mechanism, then acts to return to the reference position by the biasing force of the return biasing member, and the second switching operation in which the rotation member acts to rotate in the second direction from the reference position against the biasing force of the return biasing member, by the motive power of the driving actuator, to switch the switching member from the second position to the first position via the cooperation mechanism, then acts to return to the reference position by the biasing force of the return biasing member, thereby switching the actuation state of the locking/unlocking mechanism between the locked and unlocked states or switching a shift of the actuation state of the locking/ unlocking mechanism between the ineffective and effective states, by switching the switching member between the first and second positions.

By providing the configuration in which the actuator device of the present invention is made to be incorporated into a vehicle door lock device to apply the first and second operation mechanisms of the actuator device respectively as an electric release mechanism to release engagement of an engagement mechanism and an electric switching mechanism to activate a locking/unlocking mechanism, and the operation releasing the engagement of the engagement mechanism is performed by the actuation of the rotation member in the first direction, and the operation moving the switching member between the first and second positions to switch the actuation state of the locking/unlocking mechanism between the locked and unlocked states or to switch the shift of the actuation state of the locking/unlocking mechanism between the ineffective and effective states is performed by the actuation of the rotation member in the second direction, it is possible to perform only the operation on the engagement mechanism 2 in the actuation in the first direction and only the operation on the locking/unlocking mechanism 4 requiring the switching actuation in the actuation in the second direction, it is not necessary to separately perform the operation on the locking/unlocking mechanism 4 requiring the switching actuation, in the first and second directions, and thereby enabling the structure to be simplified and the device to be downsized.

In a preferred example of the present invention, the electric release mechanism has a release member rotating by pressing with a cam portion provided on the rotation member when the rotation member rotates in the first direction to release the engagement of the engagement mechanism, wherein the cooperation mechanism of the electric switching mechanism comprises an operation portion provided on the rotation member and a transmission member that is configured to engage with or disengage from the operation portion, the transmission member moving from a standby position to a linkage position when the rotation member rotates in the second rotation direction and moving from the linkage position to the standby position when the rotation member returns to the reference position, and wherein the switching member of the electric switching mechanism is a locking/unlocking operation member pivoting between locked and unlocked positions in which the locking/unlocking mechanism is held in the locked and unlocked states respectively by the movement of the transmission member between the standby position and the linkage position when the electric switching mechanism has the first switching function, or another locking/unlocking operation member pivoting between locked and unlocked positions in which the switching of the actuation state of the locking/unlocking mechanism is ineffective and effective respectively by the movement of the transmission member between the standby position and the linkage position when the electric switching mechanism has the second switching function.

In another preferred example of the present invention, the cam portion is provided on a first rotational surface that is one rotational surface of the rotation member, and the release member is disposed in the first rotational surface side of the rotation member, and wherein the operation portion is provided on a second rotational surface which is the other rotational surface of the rotation member, the transmission member is configured to engage with or disengage from the operation portion by being disposed such that a part of the transmission member overlaps the second rotational surface, and the locking/unlocking operation member is disposed in the second rotational surface side.

Since by providing the configuration in which the release member is disposed in the first rotational surface side and the locking/unlocking operation member (switching member) is disposed in the second rotational surface side, the operation for the engagement mechanism and the operation for the locking/unlocking mechanism can be performed by the single rotation member, and thereby enabling the structure to be simplified and the device to be downsized. Moreover, since by providing the configuration in which a part of the transmission member is disposed to overlap the rotational surface of the rotation member to be supported by the operation portion provided on the rotation member, it is not necessary to provide a structure for pivotally supporting the transmission member by a shaft, and it is possible to provide a configuration in which the driving force of the driving actuator is surely transmitted to the switching member by the transmission member while simplifying the structure.

In another preferred example of the present invention, the electric switching mechanism has a mechanical cam mechanism comprising gear-shaped first and second cam members that are coaxially provided to integrally rotate, the mechanical cam mechanism being provided between the cooperation mechanism and the switching member, wherein the first cam member has a plurality of engagement teeth that extend radially outward from a rotation center thereof, and the plurality of engagement teeth sequentially mesh with an engaged portion provided on the switching member in accordance with the rotation of the first cam member to move the switching member between the locked and unlocked positions, and wherein the second cam member has a plurality of engagement teeth radially extending outward from a rotation center thereof, the plurality of engagement teeth are spaced apart from the transmission member when the transmission member is in the standby position, and are configured to be engaged with and pressed by a cam pressing portion provided on the transmission member to integrally rotate the first and second cam members when the transmission member moves from the standby position to the linkage position.

In still another preferred example of the present invention, each engagement tooth of the first cam member has a tongue piece shape in a rotational surface view, a tip portion of each of the engagement teeth is formed with a first step portion for locking the engaged portion of the switching member, and a bottom portion of each inter-tooth recess portion of the first cam member is formed with a second step portion for locking the engaged portion of the switching member, and wherein each engagement tooth of the second cam member has a mountain shape in a rotational surface view and has a smaller tooth width than each of the engagement teeth of the first cam member, the number of teeth of the second cam member is twice the number of teeth of the first cam member, and the first and second cam members are arranged in an overlapping manner such that the alternately formed engagement teeth and inter-tooth recesses of the first cam member are alternately arranged with respect to the plurality of engagement teeth of the second cam member.

Since by providing the configuration in which each of the engagement teeth of the second cam member has a smaller tooth width than each of the engagement teeth of the first cam member and has a mountain shape in the rotational surface view as described above, the transmission member can move from the linkage position to the standby position without interfering with the second cam member after pressing the second cam member, and therefore, the operation for the engagement mechanism and the operation for the locking/unlocking mechanism can be realized in a space-saving manner and the device can be downsized.

In another preferred example of the present invention, the second rotational surface of the rotation member faces an inner surface of a housing that accommodates the locking/unlocking mechanism, the electric release mechanism, and the electric switching mechanism, a wall portion protruding perpendicularly from the second rotational surface is provided on the rotation member, a guide wall is provided on the inner surface of the housing, and a guide groove is formed on the inner surface of the housing between the wall portion and the guide wall, wherein the transmission member is provided with a biasing portion supporting a hold biasing member and a sliding portion abutting against the guide groove of the housing, the biasing portion being pressed by the hold biasing member such that a central portion of the transmission member abuts against the operation portion, and wherein the transmission member is disposed between the wall portion and the guide wall to be configured to engage with and disengage from the operation portion, is pushed by the operation portion to move from the standby position to the linkage position while sliding in contact with the guide groove of the housing and the second rotational surface of the rotation member when the rotation member rotates in the second direction, and is configured such that a cam pressing portion provided on the transmission member protrudes from between the wall portion and the guide wall as the transmission member approaches the linkage position. By providing such a configuration in which the transmission member is disposed to overlap the rotation member, the locking/unlocking mechanism and the rotation member can be brought close to each other, thereby enabling the device to be downsized.

In a more preferred example of the present invention, the guide wall of the housing is provided along an outer circumference of the rotation member, wherein the transmission member is provided with a sliding portion abutting against the wall portion and another sliding portion abutting against the guide wall, wherein the holding biasing member is configured to press the transmission member toward the operating portion such that the transmission member moves along the guide wall, and wherein when the transmission member is in the standby position, the transmission member abuts against the wall portion and the guide wall, and when the rotation member rotates in the second direction, the transmission member is pressed by the operation portion to move from the standby position to the linkage position while sliding contact with the guide groove of the housing and the second rotational surface of the rotation member and while sliding contact with the guide wall. By such a configuration, the transmission member can move along the guide wall surely, and thus a high reliability of the device can be obtained.

In another preferred example of the present invention, the electric switching mechanism has a function of switching between double locked and non-double locked states in which the locked state of the locking/unlocking mechanism is held and is not held respectively, as the second switching function, thereby switching between the double locked and non-double locked states of the locking/unlocking mechanism by switching the switching member between the first and second positions when the electric switching mechanism is actuated.

In still another preferred example of the present invention, the electric switching mechanism has a function of switching between double locked and non-double locked states in which the locked state of the locking/unlocking mechanism is held and is not held respectively, as the second switching function, and wherein the vehicle door lock device is provided with another electric switching mechanism that has the first switching function and comprises another driving actuator separate from the driving actuator.

More preferably, the locking/unlocking mechanism is configured to be switched between the locked and unlocked states by said another electric switching mechanism. Thus, the locking/unlocking mechanism can be quickly switched from the locked state to the unlocked state in an emergency situation or the like and the actuation time of the driving actuator when the locked state is quickly switched to the unlocked state can be shortened, and the NVH (Noise, Vibration, Harshness) of the vehicle can be reduced.

In another preferred example of the present invention, the electric switching mechanism has a function of switching between double locked and non-double locked states in which the locked state of the locking/unlocking mechanism is held and is not held respectively, as the second switching function, and wherein the switching member is a locking/unlocking operation member that rotates between locked and unlocked positions in which the locking/unlocking mechanism is held in the double locked and non-double locked states respectively by the movement of the transmission member between the standby position and the linkage position.

Hereinafter, the present invention is explained in detail by referring to an embodiment according to the drawings. However, the present invention is not limited to the following description and various modifications may be made within the scope of the technical thought of the present invention.

As shown in FIGS. 1 to 7, a vehicle door lock device 1 provided with an actuator device of the present invention comprises:

an engagement mechanism 2 holding a door in a closed position, a manual release mechanism 3 capable of acting to release the engagement of the engagement mechanism 2 by a manual operation force, a locking/unlocking mechanism 4 in which an actuation state is switched between locked and unlocked states in which the release actuation of the manual release mechanism 3 is ineffective and effective respectively, an electric release mechanism (a first operation mechanism of the actuator device) 5 capable of releasing the engagement of the engagement mechanism 2 by an electromotive power, a first electric switching mechanism (a second operation mechanism of the actuator device) 6 switching double locked and non-double locked states in which the locked state of the locking/unlocking mechanism 4 is held and is not held respectively by the electromotive power, and a second electrical switching mechanism 7 switching between the locked and unlocked states of the locking/unlocking mechanism 4.

The actuator device of the present invention is configured with the above-described electric release mechanism 5 as the first operation mechanism and the above-described first electric switching mechanism 6 as the second operation mechanism, and has a function of activating the above-described engagement mechanism 2 and the above-described locking/unlocking mechanism 4 respectively. Therefore, it should be understood that the detailed description of the configuration, actuation, function, and the like of each of the electric release mechanism 5 and the first electric switching mechanism 6 described below as components of the vehicle door lock device 1 also serves as a description of an embodiment of the actuator device of the present invention.

Figure 2:
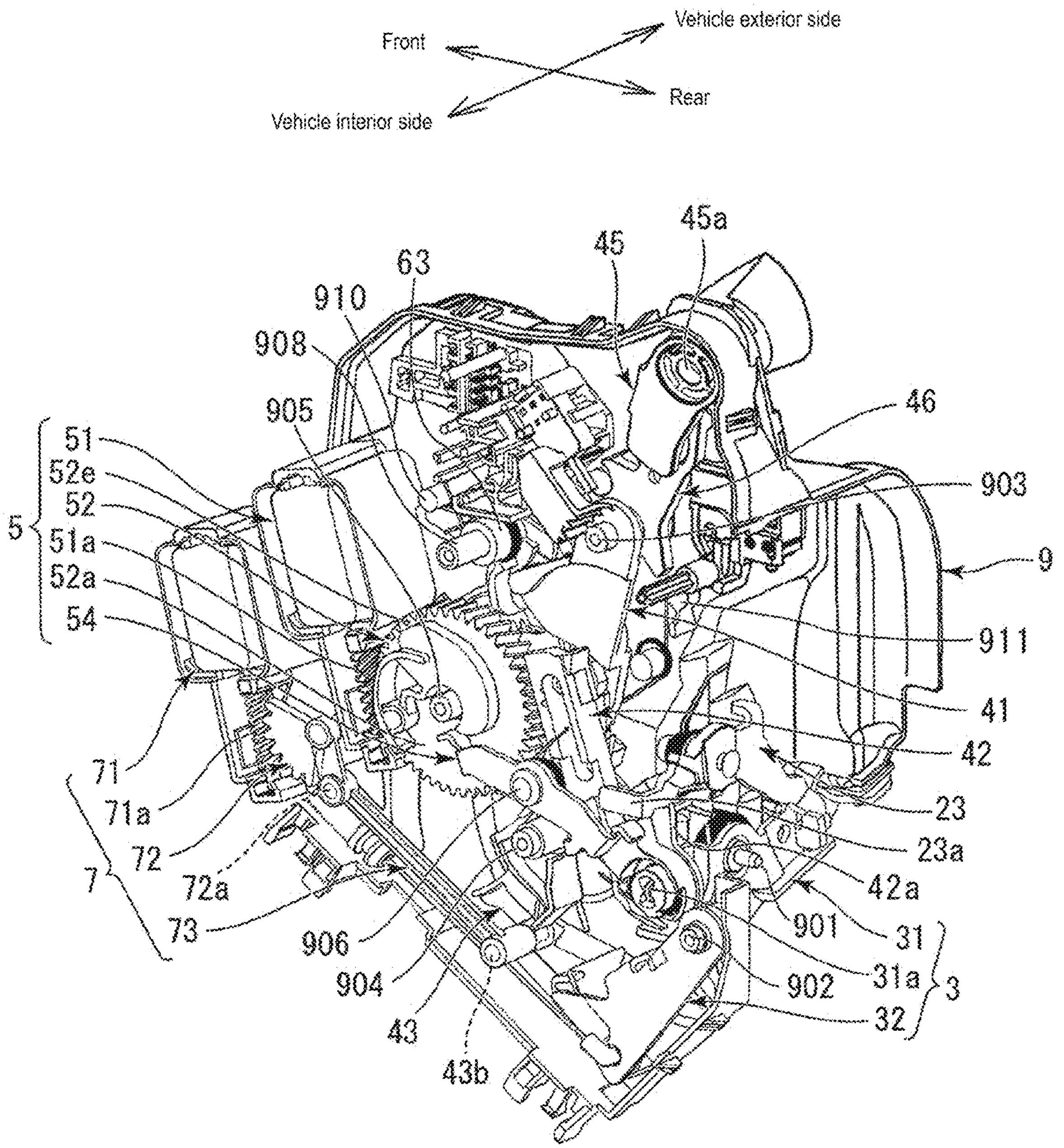
FIG. 2 is a perspective view showing an internal structure of the vehicle door lock device shown in FIG. 1.
Figure 3:
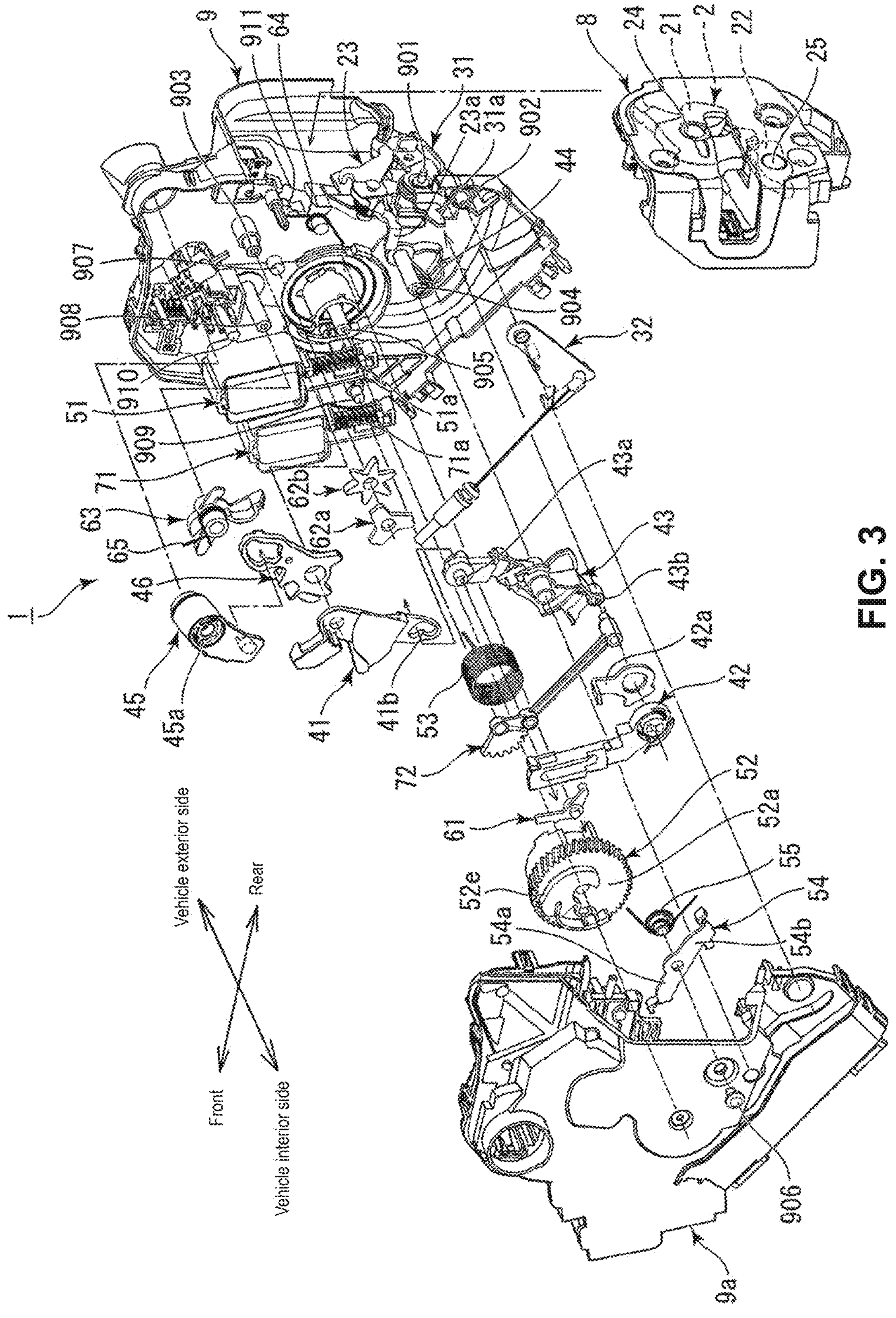
FIG. 3 is an exploded perspective view showing the internal structure of the vehicle door lock device shown in FIG. 1.

As shown in FIGS. 1,3, the engagement mechanism 2 comprises a latch 21 pivotally supported by a latch shaft 24 in a body 8 fixed in the door to engage with a striker (not shown) on a vehicle body side when the door is closed, a ratchet 22 that is pivotally supported by a ratchet shaft 25 in the body 8 and engages with the latch 21 engaging with the striker to prevent the latch 21 from rotation of and hold the door in the closed position, and a ratchet lever 23 (see FIGS. 2, 3) that can rotate integrally with the ratchet 22.

The ratchet 22 pivots around the pivot shaft 25 in a release direction that is a clockwise direction in FIG. 1 to release the engagement with the latch 21, and allows the door to open. In the present embodiment, the ratchet 22 and the ratchet lever 23 are separate bodies, but the present invention is not limited thereto, and the ratchet 22 and the ratchet 23 may be integrated.

As shown in FIGS. 2, 3, the manual release mechanism 3 includes an outside lever 31 interlocked with a mechanical operation of an outside handle (not shown) provided on a vehicle exterior side of the door, and an inside lever 32 interlocked with a mechanical operation of an inside handle (not shown) provided on a vehicle interior side of the door.

The outside lever 31 is pivotally supported to a housing 9 fixed to the body 8 by a pivot shaft 901 oriented to a front-rear direction and pivots around the pivot shaft 901 in a release direction (a clockwise direction in FIG. 2) in conjunction with a mechanical operation of the outside handle. The pivoting motion of the outside lever 31 is transmitted to the ratchet 22 via the ratchet lever 23 as described below when the locking/unlocking mechanism 4 is in the unlocked state, and is not transmitted to the ratchet 22 as described below when the locking/unlocking mechanism 4 is in the locked state.

The inside lever 32 is pivotally supported to the housing 9 by a pivot shaft 902 oriented to a vehicle interior-exterior direction and pivots around the pivot shaft 902 in a clockwise direction in FIG. 3 in conjunction with a mechanical operation of the inside handle. The pivoting motion of the inside lever 32 is directly transmitted to the outside lever 31. Therefore, the mechanical motion of the inside handle is transmitted to the ratchet 22 when the locking/unlocking mechanism 4 is in the unlocked state, and is not transmitted to the ratchet 22 when the locking/unlocking mechanism 4 is in the locked state. The left side surface of the housing 9 facing the vehicle interior side is closed by a cover 9*a* as shown in FIGS. 1, 3.

The locking/unlocking mechanism 4 is configured to include a locking lever 41 pivotally supported to the housing 9 by a pivot shaft 903, an open link 42 coupled to the locking lever 41, and an active lever 43 pivotally supported to the housing 9 by a pivot shaft 904.

The lock lever 41 is pivotable around the pivot shaft 903 in the front-rear direction. The lock lever 41 can pivot in a clockwise direction by a predetermined angle from an unlocked position (see FIG. 22) in which the locking/unlocking mechanism 4 is in the unlocked state to a locked position (see FIG. 4) in which the locking/unlocking mechanism 4 is made to be the locked state by the rotation of a rotation member (a rotation cam) 52 described below by motive power of a first driving actuator (a first motor) 51 described below, a manual operation force of a key cylinder provided on the vehicle exterior side of the door by using a key, or pivoting of a sector gear 72 by motive power of a second driving actuator (a second motor) 71 described below, and vice versa. A protrusion-shaped input portion 41*a* (see FIG. 6) on which a switching member (a switching lever) 63 of the first electric switching mechanism 6 described below acts is provided on the rotation cam 52 side of a central portion of the lock lever 41.

An upper end portion of the lock lever 41 is connected to a key lever 45 which is pivotally supported to the housing 9 to pivot around a pivoting portion 45*a* in conjunction with pivoting of the key cylinder by using the key. The key lever 45 is connected to the lock lever 41 via a sub-key lever 46 pivotally supported to a lower side of the key lever 45. Thus, in an emergency situation in which the switching actuation of the locking/unlocking mechanism 4 by the motive power of the second driving actuator (the second motor) 71 described below is ineffective due to a voltage drop of a battery or the like, the locking/unlocking mechanism 4 can be switched from the locked state or the double locked state to the unlocked state by the manual operation force by using the key, and can also be switched from the unlocked state to the locked state. In the present embodiment, since the locking/unlocking mechanism 4 is brought into the unlocked state by the motive power of the second motor 71 to enable the door to be opened, the operation of the locking/unlocking mechanism 4 by using the key is not performed basically unless an emergency situation occurs.

An upper portion of the open link 42 is coupled to a lower portion of the lock lever 41 to be pivotable while slidable in a vertical direction, and a lower end portion of the open link 42 is coupled to a coupling portion 31*a* which is an end portion of the outside lever 31 to be pivotable by a predetermined angle in the front-rear direction. Accordingly, when the locking lever 41 pivots from the unlocked position (see FIG. 22) to the locked position (see FIG. 4) or from the locked position to the unlocked position, the open link 42 pivots from the unlocked position to the locked position by a predetermined angle in a counterclockwise direction around the coupling portion 31*a* as a pivoting center, or from the locked position to the unlocked position.

In a case where the locking lever 41 and the open link 42 are in each of the unlocked positions (see FIG. 22), when the outside lever 31 pivots based on an operation by a mechanical motion of the outside handle or the inside handle, the open link 42 moves upward from the unlocked position, and a release portion 42*a* provided on the open link 42 abuts against an end portion 23*a* of the ratchet lever 23 from below. As a result, the ratchet lever 23 and the ratchet 22 respectively pivot in the release direction to release the engagement of the engagement mechanism 2.

In a case where the locking lever 41 and the open link 42 are in each of the locked positions (see FIG. 4), even when the outside lever 31 pivots based on the operation by the mechanical motion of the outside handle or the inside handle, the release portion 42*a* of the open link 42 does not abut against the end portion 23*a* of the ratchet lever 23 because the open link 42 is guided in a front obliquely upward direction by the locking lever 41. Therefore, since the ratchet lever 23 and the ratchet 22 do not pivot in each of the release directions, the door cannot be opened based on the operation by either the mechanical motions of the outside handle or the inside handle.

A substantially central portion in the vertical direction of the active lever 43 is pivotally supported to the housing 9 by the pivot shaft 904, and a coupling shaft 43*a* provided on an upper end portion of the active lever 43 is coupled to a bent long hole 41*b* provided in a lower portion of the lock lever 41 to be pivotable while movable vertically. Thus, the active lever 43 pivots following the pivoting of the lock lever 41, is elastically held in the locked position shown in FIG. 4 when the lock lever 41 is in the locked position, and is elastically held in the unlocked position shown in FIG. 22 in which the active lever 43 pivots in a clockwise direction by a predetermined angle from the locked position when the lock lever 41 is in the unlocked position. The active lever 43 is elastically held in the locked position and the unlocked position by an elastic force of a spring 44 acting on the active lever 43. The holding force of the spring 44 elastically holding the active lever 43 in each of the positions is also transmitted to the lock lever 41.

Figure 4:
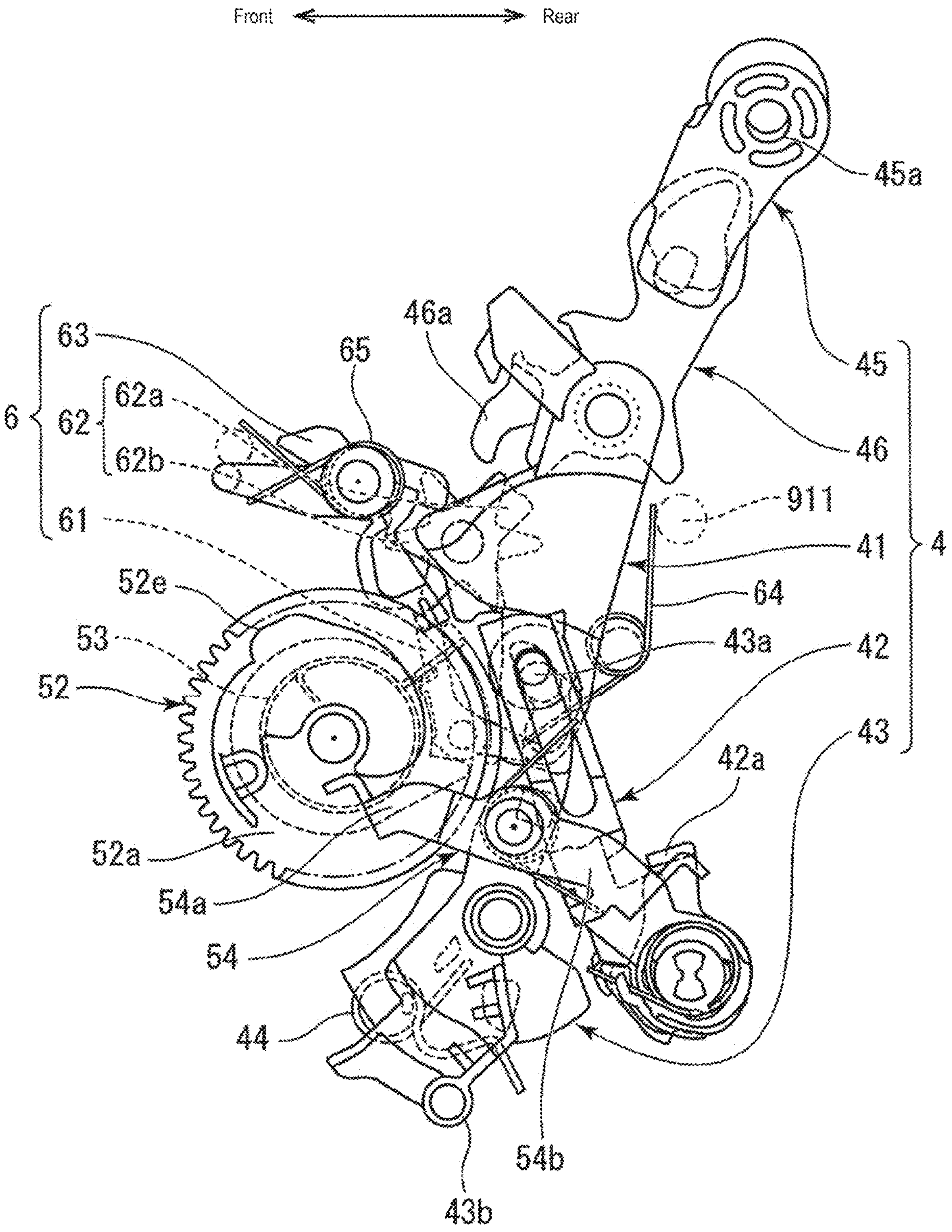
FIG. 4 is a front elevational view showing a principal part in a non-double locked state of the vehicle door lock device shown in FIG. 1.

As shown in FIGS. 2, 3, the electric release mechanism 5 comprises:

- the first driving actuator (the first motor: the driving actuator of the actuator device) 51 supported by the housing 9,
- the rotation member (the rotation cam: a two-way actuation member of the actuator device) 52 constituted by a worm wheel which is rotatable forwardly and backwardly around a rotation shaft 905 based on a motive power of the first motor 51 by engaging with a worm gear 51*a* rotating integrally with a rotation shaft of the first motor 51, and
- a release member (an open lever: an operation member of the actuator device) 54 that is pivotable in a counterclockwise direction around a pivot shaft 906 when the rotation cam 52 rotates in a forward direction (a first direction: a clockwise direction in FIG. 4) from a reference position shown in FIG. 4.

The first motor 51 is driven to rotate forwardly when a sensor (not shown) detects an initial motion of the mechanical motion of the outside handle or when a wireless control switch used also as a transmitter carried by a user is operated to unlock, and is driven to rotate backwardly when the wireless control switch used also as the transmitter is operated to lock. The detection by the sensor is effective only when the wireless control switch used also as the transmitter is authenticated by an authentication device equipped with the vehicle.

The rotation cam 52 is pivotally supported to the housing 9 by the rotation shaft 905 oriented to the vehicle interior-exterior direction, has a circular first rotational surface 52*a* on the vehicle interior side and a circular second rotational surface 52*b* on the vehicle exterior side, and is elastically held at the reference position shown in FIGS. 4 to 7, for example, by a biasing force of a return biasing member (spring) 53 provided on the back side (the second rotational surface 52*b* side) of the rotation cam 52. One end portion of the spring 53 is supported by the housing 9, and the other is supported by a holding portion 52*d* provided outside a cylindrical wall portion 52*c* protruding perpendicularly from the second rotational surface 52*b* of the rotation cam 52. The rotation cam 52 rotates in the forward direction (the clockwise direction in FIG. 4: the first direction) from the reference position against the biasing force of the spring 53 by the forward rotation of the first motor 51, rotates in a backward direction (a counterclockwise direction in FIG. 4: a second direction) from the reference position against the biasing force of the spring 53 by the backward rotation of the first motor 51, and reverses by the biasing force of the spring 53 to return to the reference position by stopping of a power supply to the first motor 51 after rotating in the forward or backward direction.

In the rotation cam 52, the first rotational surface 52*a* is provided with a cam portion 52*e* acting on an open lever 54, and the second rotational surface 52*b* is provided with an operation portion 52*f* supporting a transmission member 61 of the first electric switching mechanism 6 to be engageable and disengageable.

The open lever 54 is pivotally supported to the cover 9*a* by the pivot shaft 906 oriented to the vehicle interior-exterior direction in the first rotational surface 52*a* side of the rotation cam 52, and is elastically held at a reference position shown in FIG. 4 by a biasing force of a spring 55. The open lever 54 has a first arm portion 54*a* extending forward to overlap the first rotational surface 52*a* of the rotation cam 52, and a second arm portion 54*b* extending rearward to act on the ratchet lever 23. One end portion of the spring 55 is supported by an inner surface of the cover 9*a*, and the other is supported by the end portion of the second arm portion 54*b*.

The cam portion 52*e* of the rotation cam 52 is provided on the rotational surface (the first rotational surface) 52*a* on the front side of the rotation cam 52 to protrude in a wall shape toward the vehicle interior side. A start end of the cam portion 52*e* is provided at a position close to an end portion of the first arm portion 54*a* of the open lever 54 when the rotation cam 52 is in the reference position. The cam portion 52*e* extends in an arc shape in which a distance from the rotation shaft 905 changes over an angular range of approximately 270 degrees from the start end toward the counterclockwise direction (the second direction) in FIGS. 2 to 4, extends such that the distance from the rotation shaft 905 gradually increases from the start end, and then has a distal end portion 520*e* (see FIG. 6) in a substantially intermediate portion.

Figure 8:
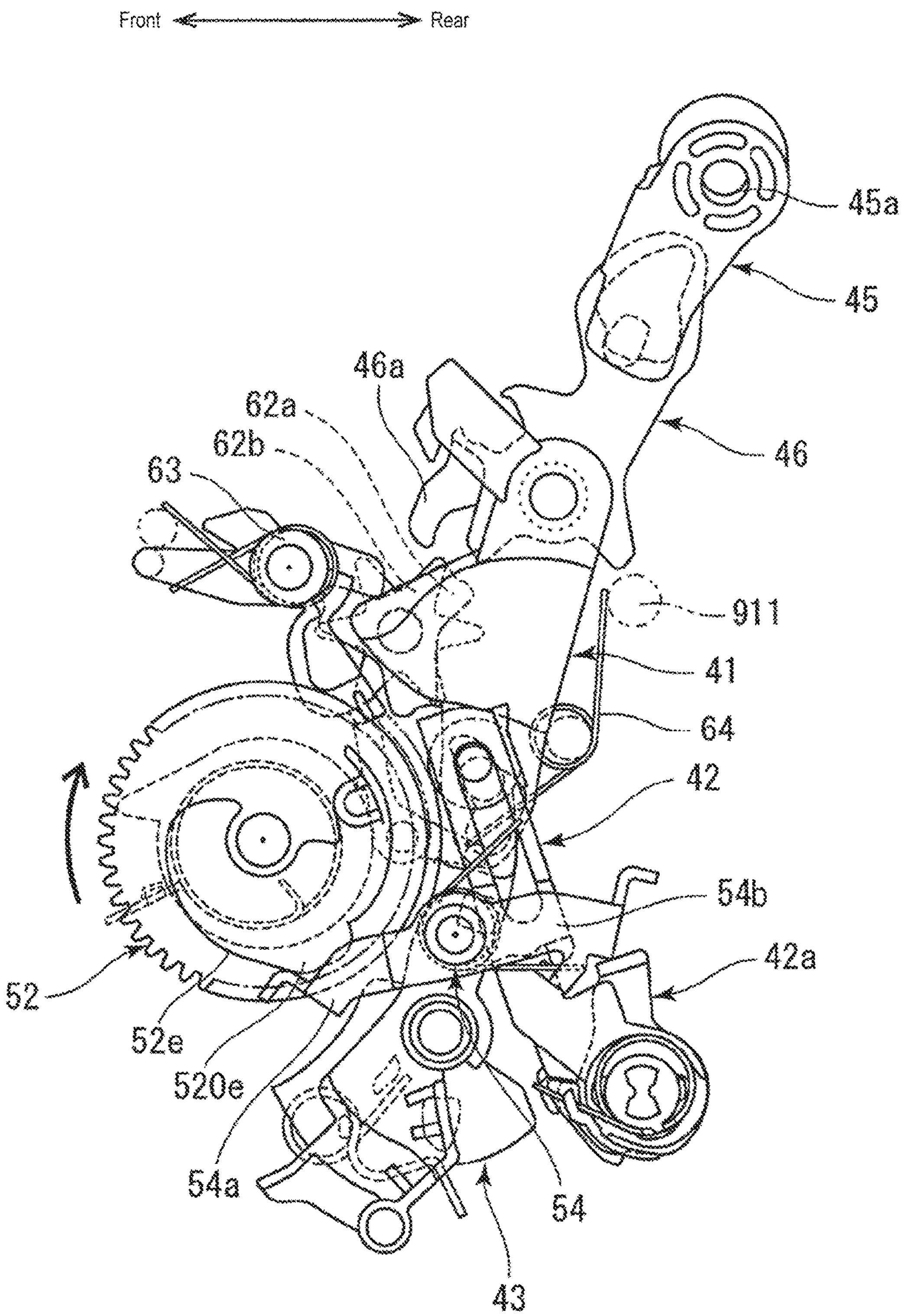
FIG. 8 is a front elevational view showing the principal part in a state where a rotation member of the principal part shown in FIG. 4 rotates in a forward direction from a reference position.

When the rotation cam 52 rotates in the first direction (the clockwise direction) from the reference position thereof (see FIG. 4) against the biasing force of the spring 53, as shown in FIG. 8, an arc surface of the cam portion 52*e* comes into contact with the first arm portion 54*a* of the open lever 54 from above, thereby pushing down the first arm portion 54*a* and making the open lever 54 pivot from the reference position thereof in the counterclockwise direction.

When the open lever 54 pivots in the counterclockwise direction in FIG. 4 from the reference position, the second arm portion 54*b* abuts against an arm portion 23*a* of the ratchet lever 23 from below to make the ratchet 22 pivot in the release direction to bring the engagement mechanism 2 into an unlatched state, thereby enabling an opening operation of the door. In this way, the open lever 54 can operate the ratchet lever 23 independently of the open link 42. Therefore, the open lever 54 is made to pivot by rotating the rotation cam 52 in the first direction from the reference position, the door can be opened regardless of the state of the locking/unlocking mechanism 4, that is, regardless of whether the locking/unlocking mechanism 4 is in the locked state, the unlocked state, the double locked state, or the non-double locked state.

When or immediately after the distal end portion 520*e* of the cam portion 52*e* rotates by a predetermined angle (about 180 degrees in the present embodiment) until it abuts against the first arm portion 54*a* of the open lever 54 such that the open lever 54 makes the ratchet 22 pivot in the release direction, the power supply to the first motor 51 stops, and the rotation cam 52 reverses to the second direction (the counterclockwise direction in FIG. 8) by the biasing force of the spring 53 to return to the reference position. The open lever 54 returns to the reference position thereof by the biasing force of the spring 55 as the rotation cam 52 rotates to return to the reference position thereof.

As shown in FIGS. 3 to 7, the first electric switching mechanism 6 comprises the first driving actuator (the first motor) 51, a cooperation mechanism (52*f*, 61) actuated by the rotation of the rotation cam 52 in the second direction, the switching member (the switch lever) 63 moving between first and second different positions when the actuation of the cooperation mechanism (52*f*, 61) is transmitted, and a mechanical cam mechanism 62 provided between the cooperation mechanism (52*f*, 61) and the switching lever 63 to transmit the actuation of the cooperation mechanism (52*f*, 61) to the switch lever 63. The cooperation mechanism (52*f*, 61) comprises the operation portion 52*f* provided on the second rotational surface 52*b* of the rotation cam 52, and the transmission member 61 supported by the operation portion 52*f* to be engageable and disengageable. The mechanical cam mechanism 62 comprises gear-shaped first and second cam members 62*a*, 62*b* that are coaxially provided to integrally rotate.

Figure 5:
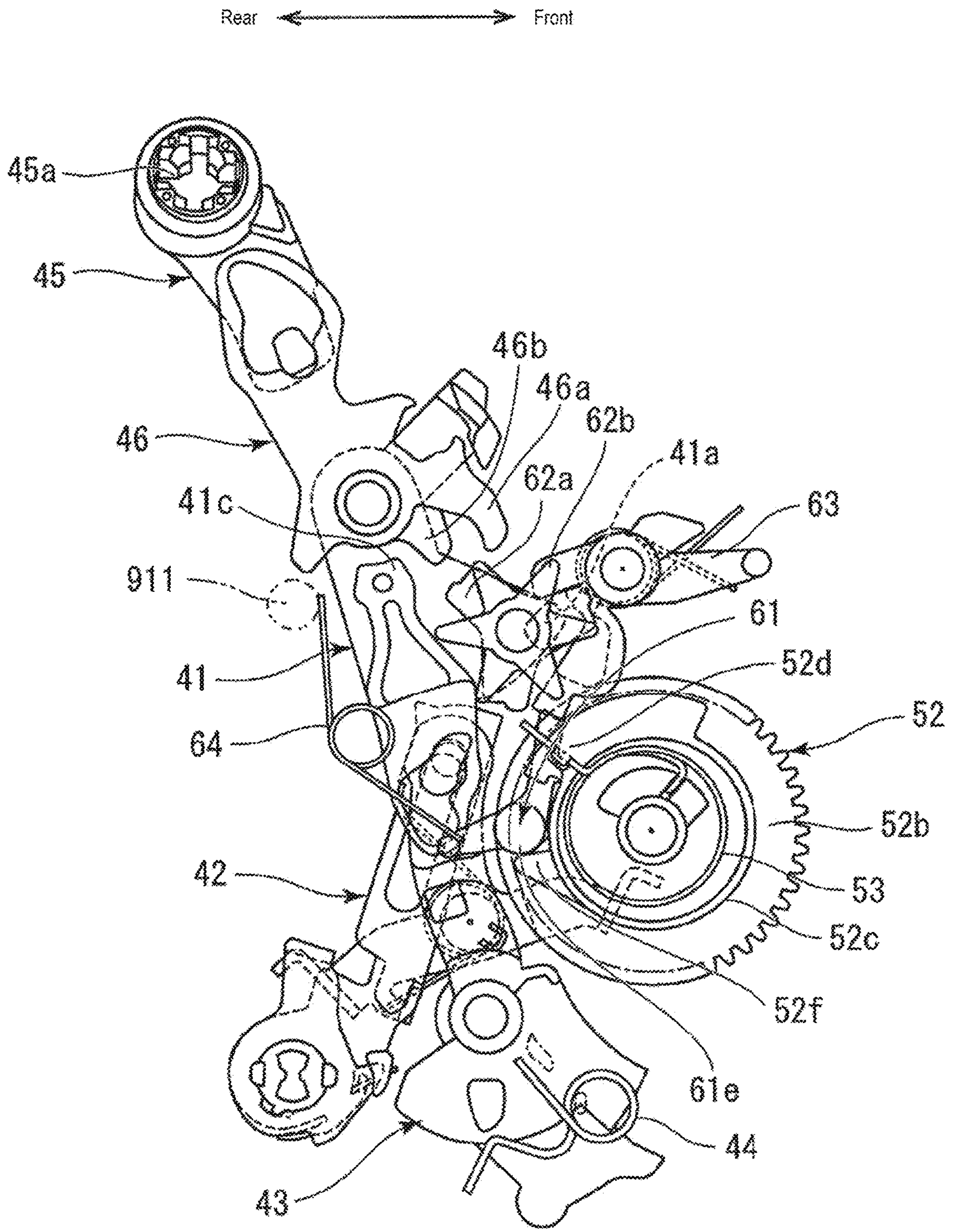
FIG. 5 is a rear elevational view showing the principal part shown in FIG. 4.
Figure 7:
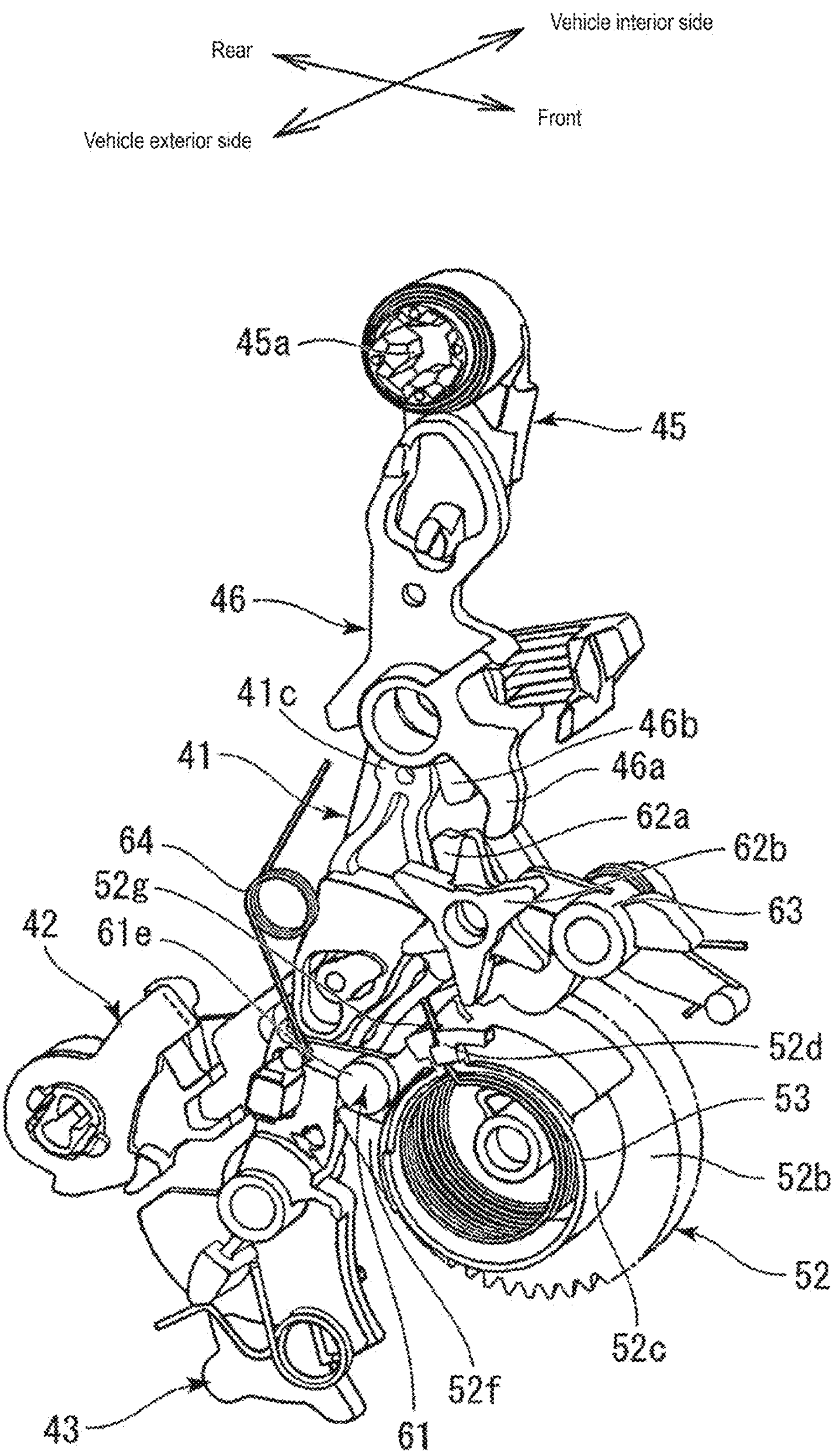
FIG. 7 is a perspective view showing the principal part shown in FIG. 4 viewed from an obliquely frontward direction in a vehicle exterior side.

As shown in FIGS. 5, 7, when the rotation cam 52 is in the reference position, the operation portion 52*f* of the rotation cam 52 is provided on the rotational surface (the second rotational surface) 52*b* on the back side of the rotation cam 52 to protrude rearward, that is, toward the active lever 43, from the cylindrical wall portion 52*c* protruding perpendicularly from the second rotational surface 52*b*.

Figure 9:
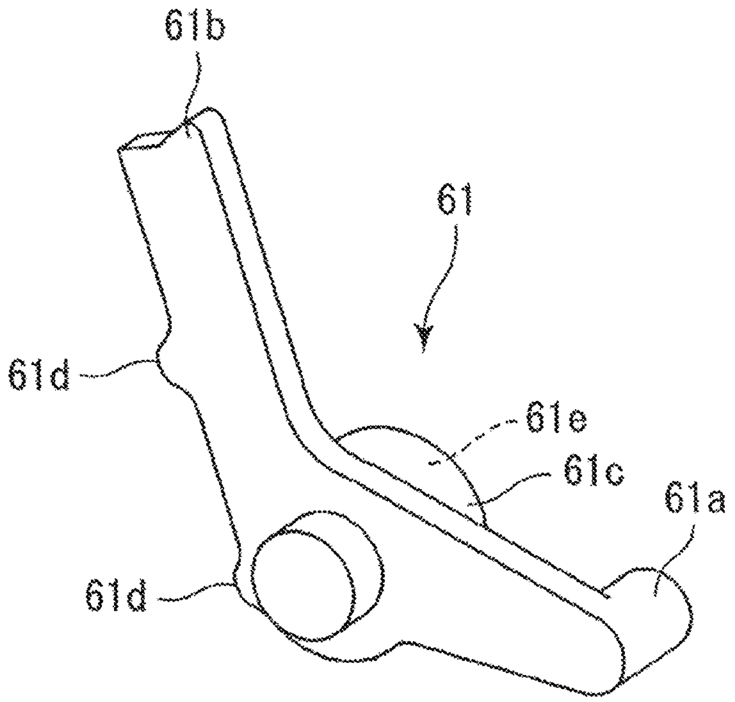
FIG. 9 is a perspective view showing a transmission member of the principal part shown in FIG. 4.

As shown in FIGS. 5, 7, a central portion of the transmission member 61 is disposed to overlap the second rotational surface 52*b* of the rotation cam 52 and is supported by the operation portion 52*f* to be engageable and disengageable. As shown in FIGS. 4, 5 and 9, the transmission member 61 comprises a biasing portion 61*a* that is provided on a tip portion of a first arm portion extending to overlap the active lever 43 and is pressed by a holding biasing member (a holding spring) 64 such that the central portion thereof abuts against the operation portion 52*f*, a cam pressing portion 61*b* provided on a tip portion of a second arm portion extending in a direction toward the mechanical cam mechanism 62, a first sliding portion 61*c* that abuts against an arc-shaped guide wall 91 (see FIG. 13) protruding from an inner surface of the housing 9 along an outer circumference of the rotation cam 52, a plurality of second sliding portions 61*d* that abut against the wall portion 52*c* (see FIGS. 5, 7, and 13) of the rotation cam 52, and a third sliding portion 61*e* that abuts against an arc-shaped guide groove 92 provided on the inner surface of the housing 9 between the cylindrical wall portion 52*c* and the arc-shaped guide wall 91 (see FIG. 13). One end portion of the holding spring 64 is supported by a support portion 911 of the housing 9, and the other is supported by the biasing portion 61*a*. The second arm portion of the transmission member 61 is supported by a slit portion 52*g* provided in the vicinity of the vehicle interior side of the holding portion 52*d* which is provided on the second rotational surface 52*b* of the rotation cam 52 to support the end portion of the spring 53.

The transmission member 61 is disposed to be capable of engaging with and disengaging from the operation portion 52*f* via the central portion thereof, abuts against each of the guide wall 91 of the housing 9, the wall portion 52*c* of the rotation cam 52, and the guide groove 92 of the housing 9 via the first to third sliding portions 61*c*, 61*d*, and 61*e* respectively, and is supported by the slit portion 52*g* of the rotation cam 52 via the second arm portion.

Figure 10:
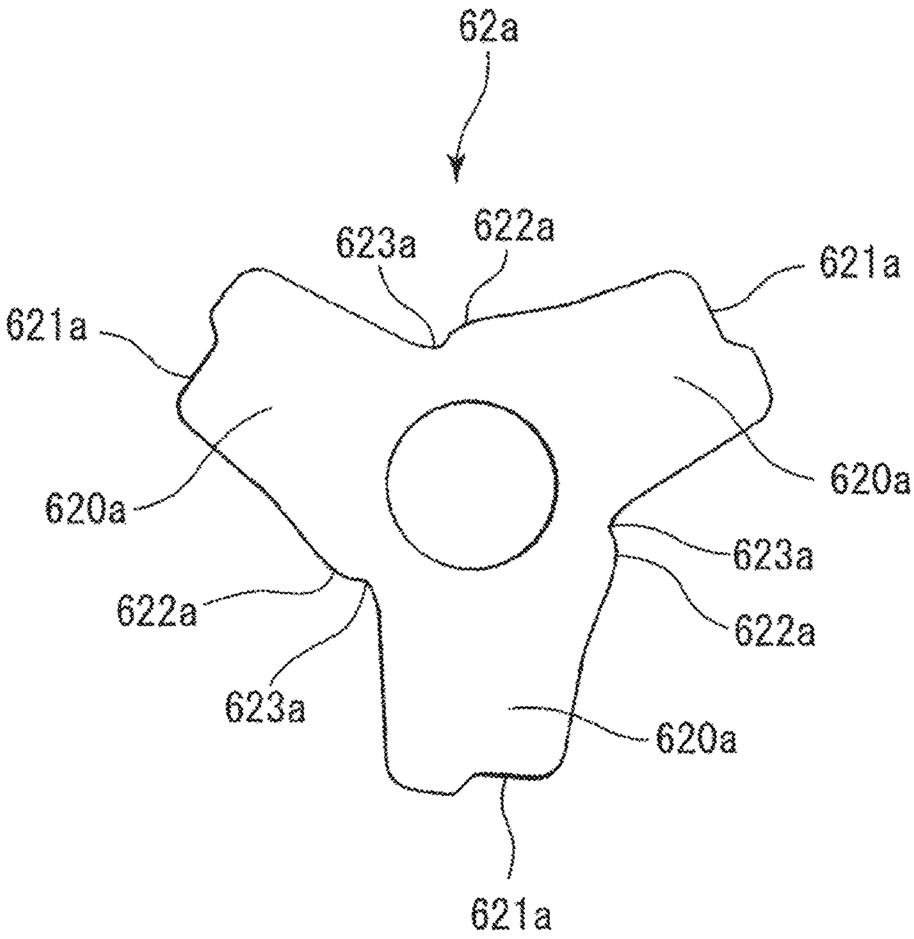
FIG. 10 is a front elevational view showing a first cam member of the principal part shown in FIG. 4.

The first and second cam members 62*a* and 62*b* of the mechanical cam mechanism 62 are integrally formed and are pivotally supported to the housing 9 by a common pivot shaft 907 oriented to the vehicle interior-exterior direction above the transmission member 61 disposed to overlap the rotation cam 52. As shown in FIG. 10, the first cam member 62*a* has a plurality of engagement teeth 620*a* which extend radially outward from a rotation center thereof, and each of which has a tongue piece shape in a rotational surface view. The plurality of engagement teeth 620*a* sequentially mesh with an engaged portion (an abutting arm) 63*b* provided on the switch lever 63 in accordance with the rotation of the first cam member 62*a* to make the switch lever 63 pivot between the locked and unlocked positions. A tip portion of each of the engagement teeth 620*a* is formed with a first step portion 621*a* against which the abutting arm 63*b* of the switch lever 63 abuts, and a bottom portion of each inter-tooth recess portion 622*a* having a V-shape in the rotational surface view is formed with a second step portion 623*a* against which the abutting arm 63*b* of the switch lever 63 abuts.

Figure 11:
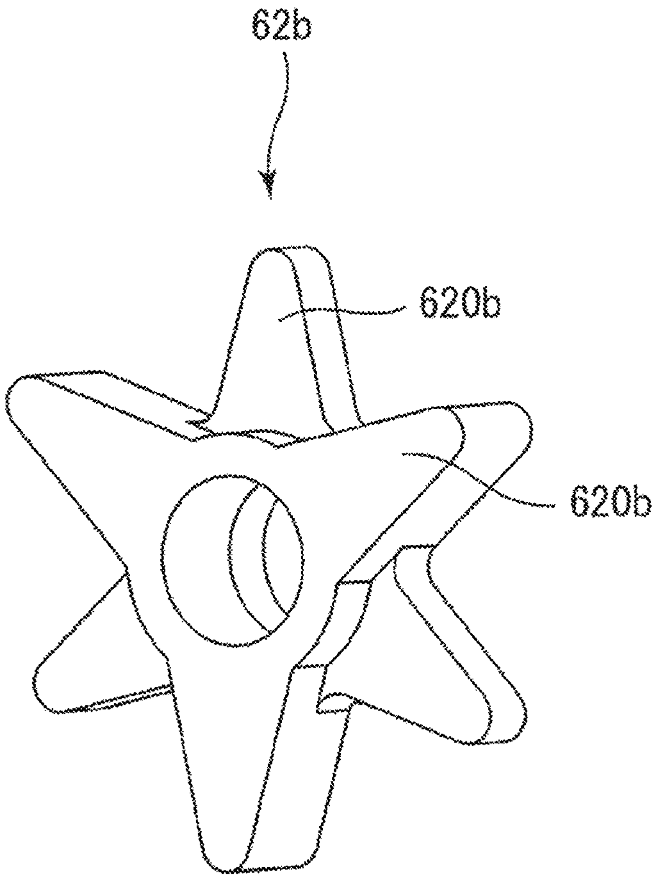
FIG. 11 is a perspective view showing a second cam member of the principal part shown in FIG. 4.

As shown in FIG. 11, the second cam member 62*b* has a plurality of engagement teeth 620*b* extending radially outward from the rotation center thereof and having a mountain shape in the rotational surface view. The plurality of engagement teeth 620*b* are separated from the transmission member 61 when the transmission member 61 is in a standby position described below, and are engaged with and pressed by the cam pressing portion 61*b* of the transmission member 61 to integrally rotate the first and second cam members 62*a*, 62*b* when the transmission member 61 moves from the standby position to a linkage position described below. Each of the engagement teeth 620*b* of the second cam member 62*b* has a smaller tooth width than each of the engagement teeth 620*a* of the first cam member 620*a*, the number of teeth of the second cam member 62*b* (6 pieces in the present embodiment) is twice the number of teeth of the first cam member 62*a* (3 pieces in the present embodiment), and the first and second cam members 62*a*, 62*b* are integrally formed in an overlapping manner such that the alternately formed engagement teeth 620*a* and inter-tooth recesses 622*a* of the first cam member 62*a* are alternately arranged with respect to the plurality of engagement teeth 620*b* of the second cam member 62*b* (see FIG. 13). In the present embodiment, as shown in FIG. 10, the first cam member 62*a* is provided with a total of six portions with which the switching lever 63 described below is engaged, that is, three first step portions 621*a* and three second step portions 623*a* are provided, and thus the number of teeth of the second cam member 62*b* is also six.

Figure 6:
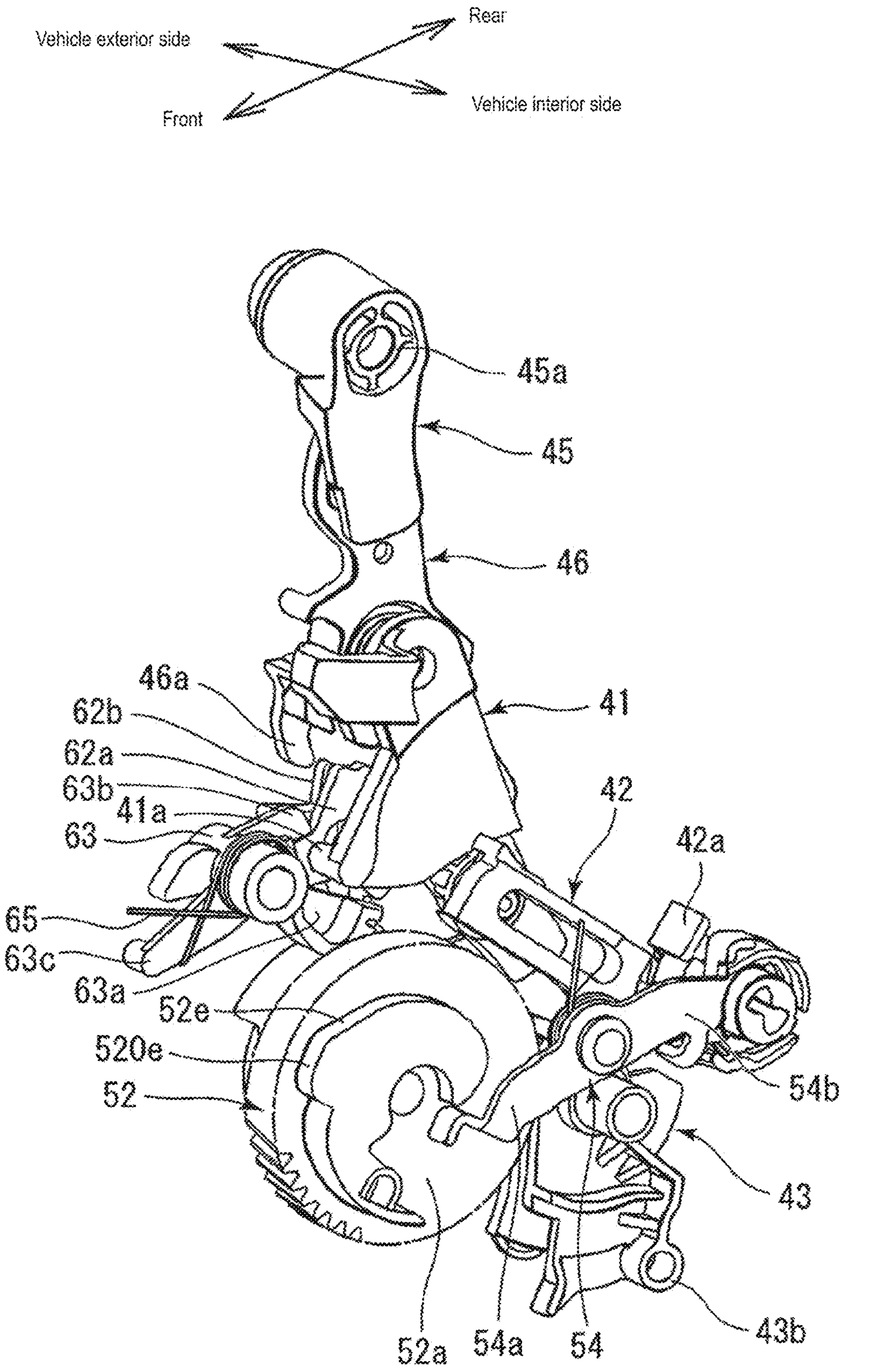
FIG. 6 is a perspective view showing the principal part shown in FIG. 4 viewed from an obliquely frontward direction in a vehicle interior side.
Figure 12:
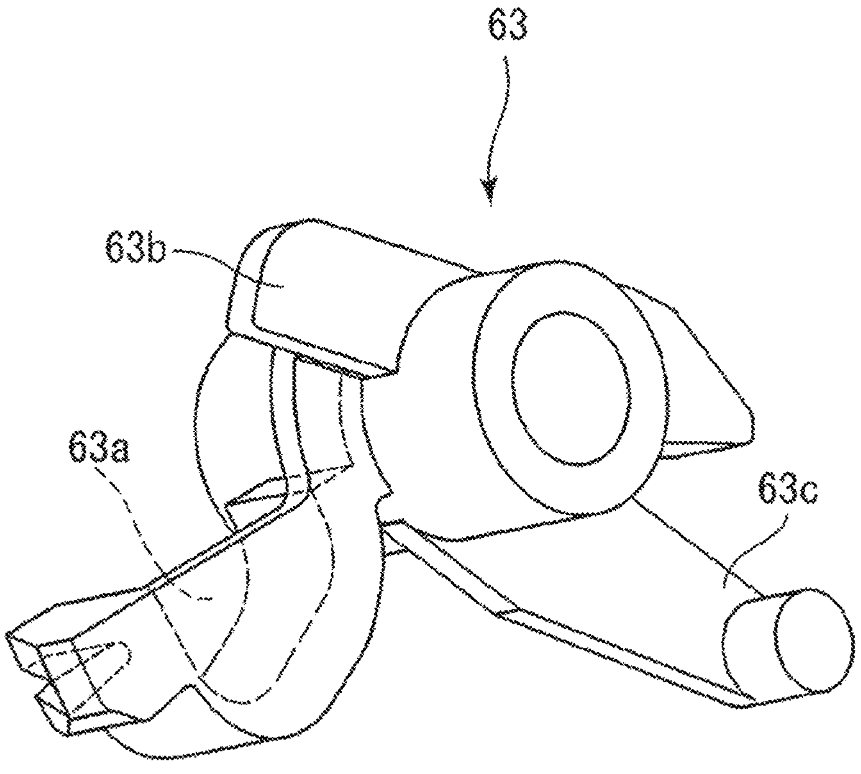
FIG. 12 is a perspective view showing a switching member of the principal part shown in FIG. 4.
Figure 13:
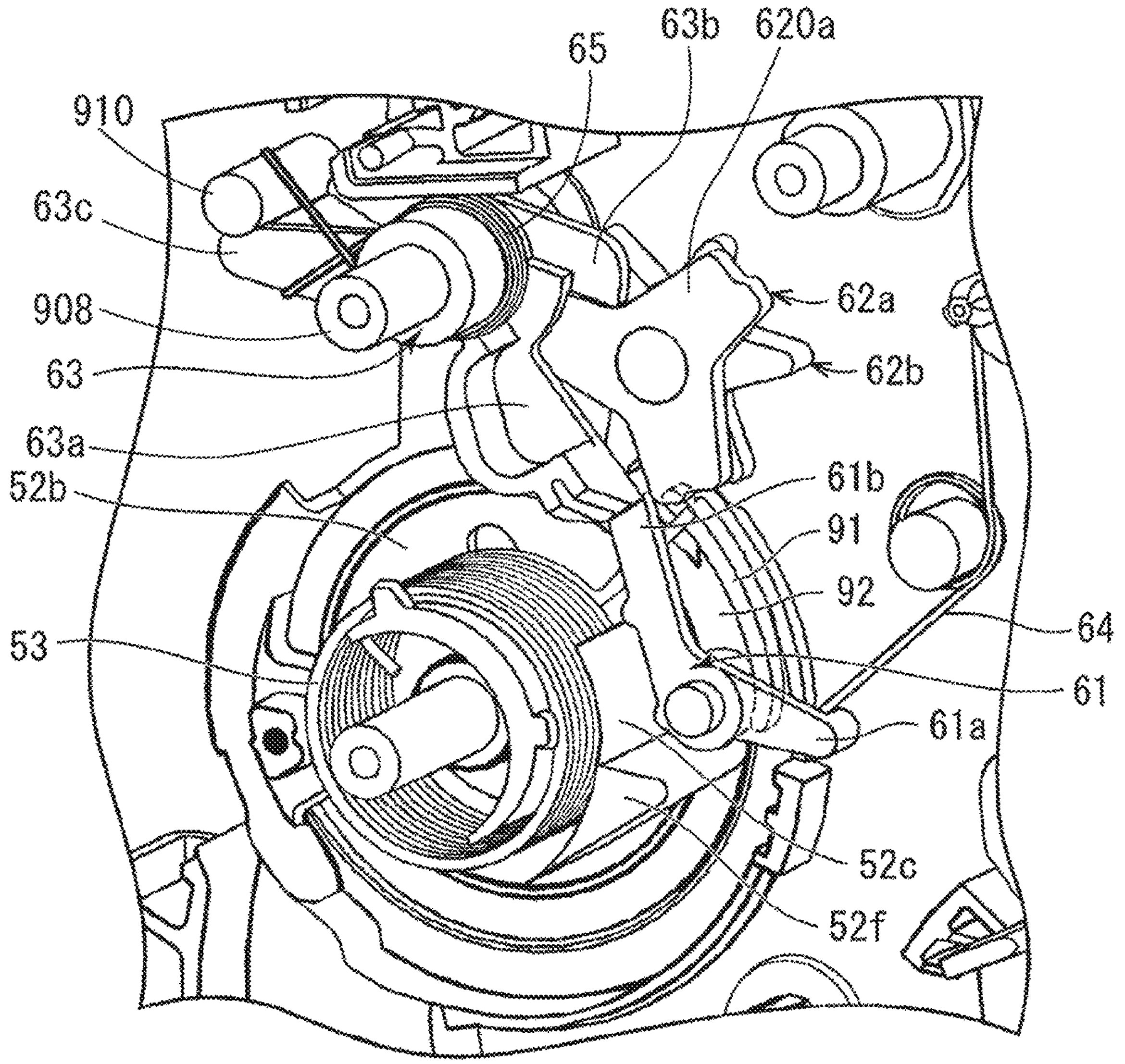
FIG. 13 is a partial perspective view showing a first electric switching mechanism of the vehicle door lock device shown in FIG. 1.

The switching lever 63 is pivotally supported to the housing 9 by a pivot shaft 908 oriented to the vehicle interior-exterior direction, in the second rotational surface 52*b* side above the rotation cam 52 and in the front side of the mechanical cam mechanism 62, and is biased in a direction of engaging with the first cam member 62*a* (the clockwise direction in FIGS. 4, 13) by a biasing force of a spring 65. As shown in FIGS. 6, 12, 13, the switch lever 63 is provided with an acting portion 63*a* extending from a central portion thereof in a rear obliquely downward direction to abut against the input portion 41*a* (see FIG. 6) of the lock lever 41 from below, the abutting arm 63*b* provided above the acting portion 63*a* to abut against the engagement teeth 620*a* of the first cam member 62*a*, and an energizing arm 63*c* extending from the central portion in a front obliquely downward direction to support one end portion of the spring 65. The other end portion of the spring 65 is supported by a protrusion 910 of the housing 9 oriented to the vehicle interior-exterior direction. The protrusion 910 also functions as a stopper against which the energizing arm 63*c* of the switching lever 63 abuts.

Figure 14:
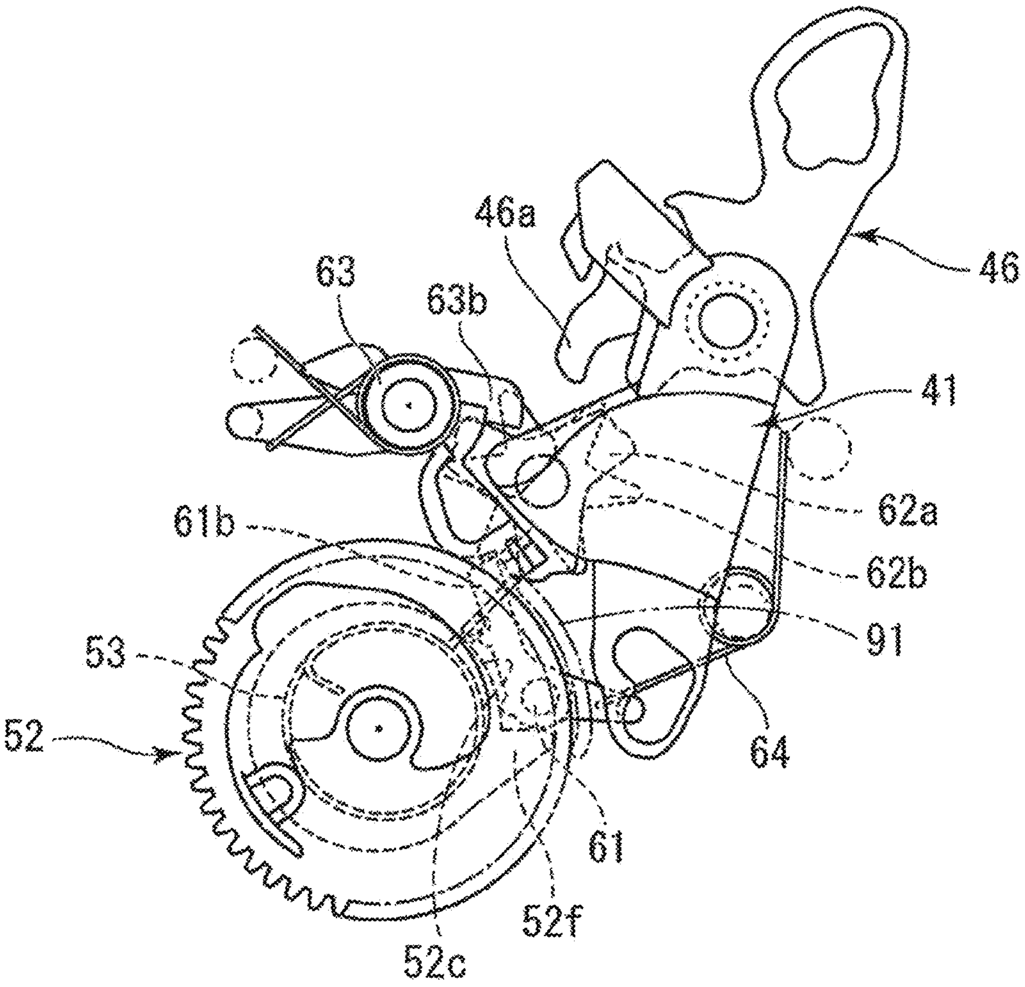
FIG. 14 is a front elevational view showing the principal part in a state where the rotation member of the principal part is rotating in a backward direction from the reference position from the non-double locked state to a double locked state.
Figure 15:
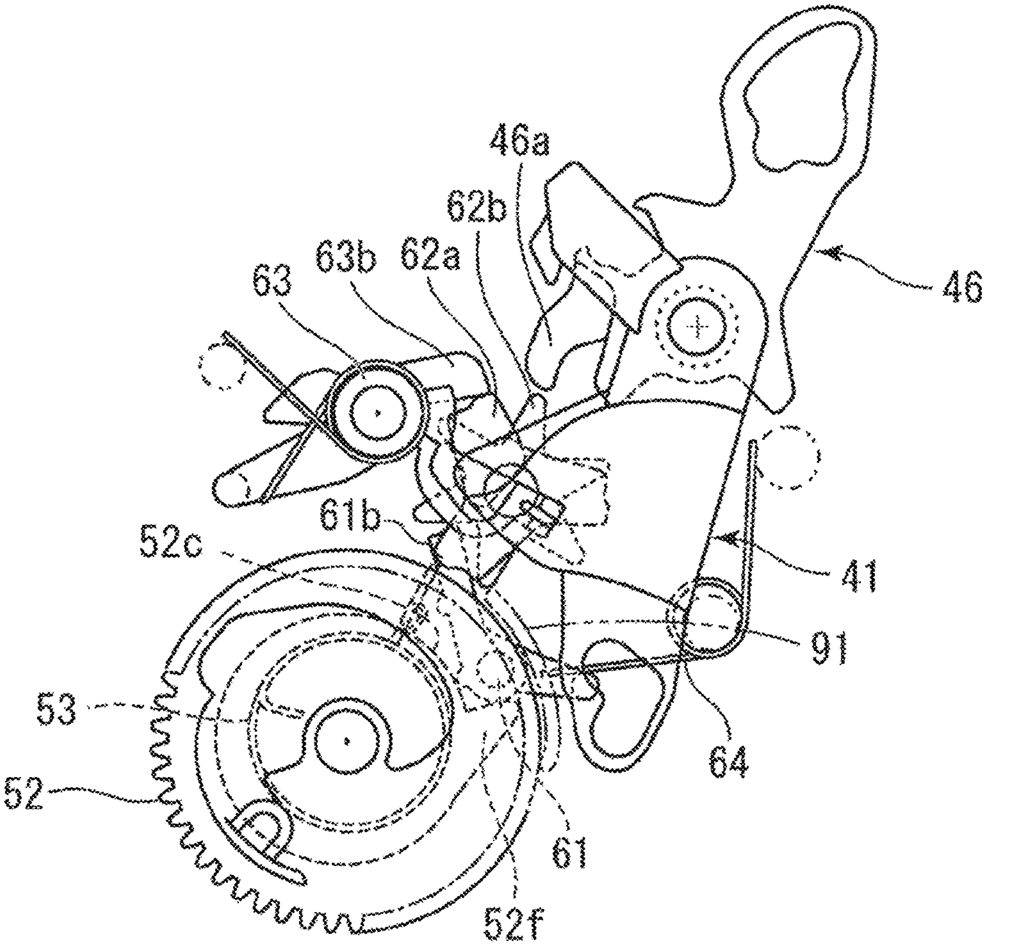
FIG. 15 is a front elevational view showing the principal part in a state where the rotation member of the principal part is further rotating in the backward direction from the reference position from the non-double locked state to the double locked state.

When the rotation cam 52 rotates in the second direction (the counterclockwise direction in FIG. 13) from the reference position against the biasing force of the spring 53, the transmission member 61 is pressed by the operation portion 52*f* to move along the guide wall 91 from the standby position shown in FIGS. 4, 5 to the linkage position shown in FIG. 15 while sliding in contact with the guide wall 91 of the housing 9, the wall portion 52*c* of the rotation cam 52, and the guide groove 92 of the housing 9, and as it approaches the linkage position, the cam pressing portion 61*b* protrudes from between the wall portion 52*c* and the guide wall 91 and presses the engagement teeth 620*b* of the second cam member 62*b* to integrally rotate the first and second cam members 62*a* and 62*b* as shown in FIGS. 4, 14, 15. At this time, the holding spring 64 presses the transmission member 61 toward the operation portion 52*f* and presses it such that the transmission member 61 moves along the guide wall 91, and thus the transmission member 61 can reliably move along the guide wall 91, and a high reliability of the device can be obtained.

Figure 16:
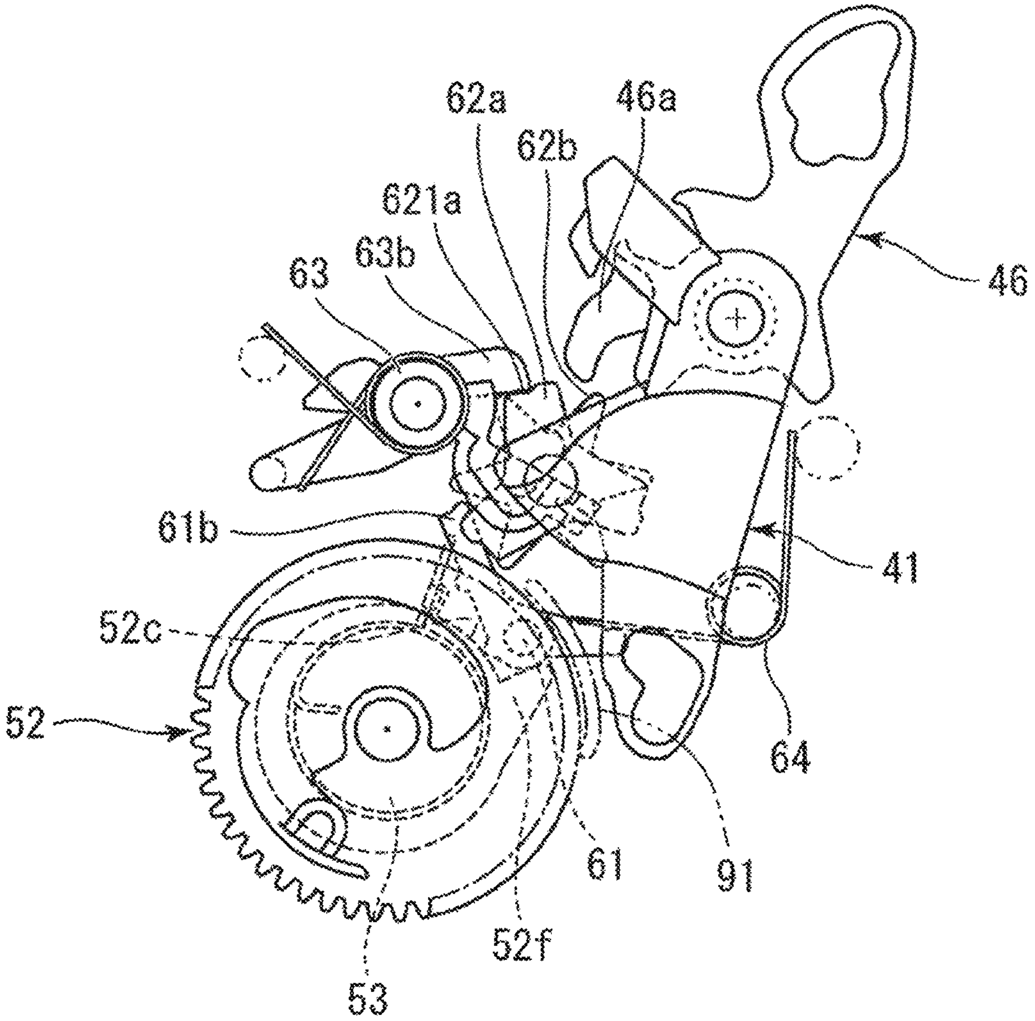
FIG. 16 is a front elevational view showing the principal part when the rotation of the rotation member in the backward direction is stopped.
Figure 17A:
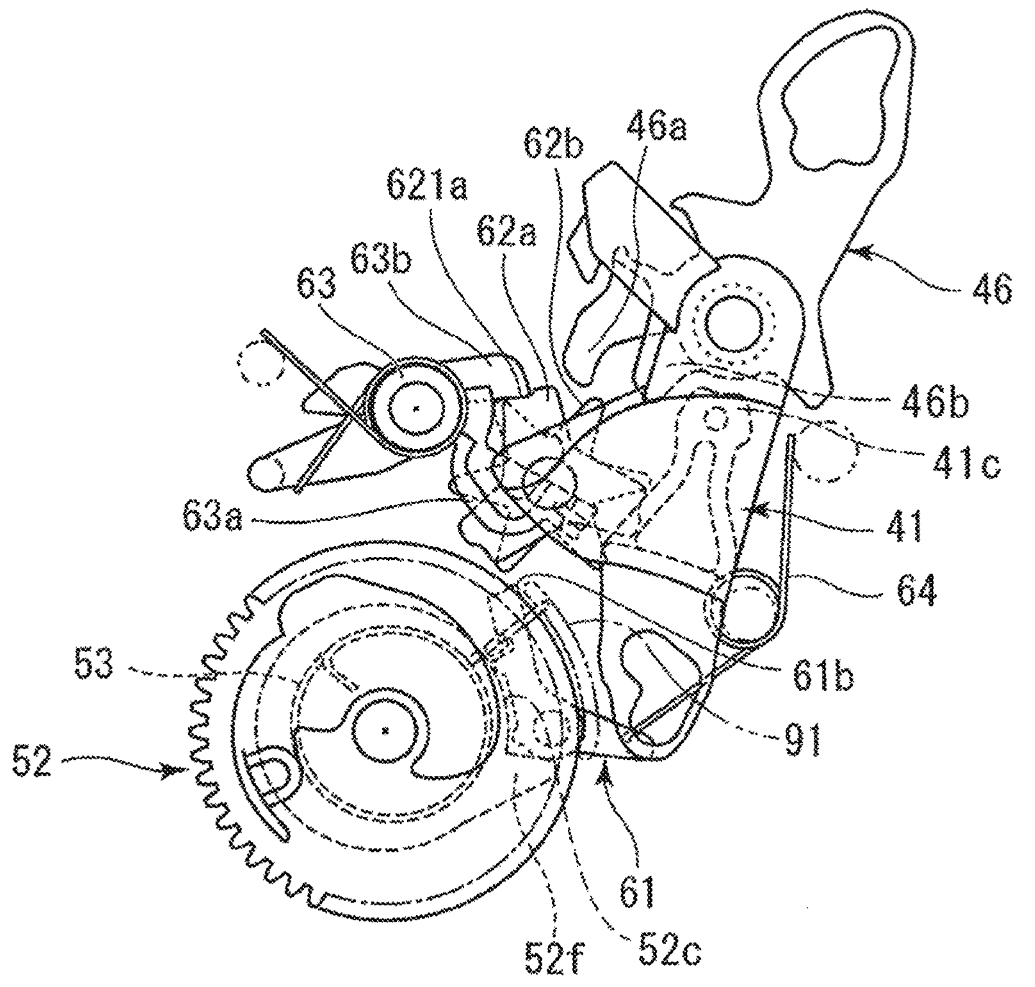
FIG. 17 (*a*) is a front elevational view showing the principal part in the double locked state of the vehicle door lock device shown in FIG. 1, and FIG. 17 (*b*) is a rear elevational view showing the principal part in the double locked state of the vehicle door lock device shown in FIG. 1.
Figure 17B:
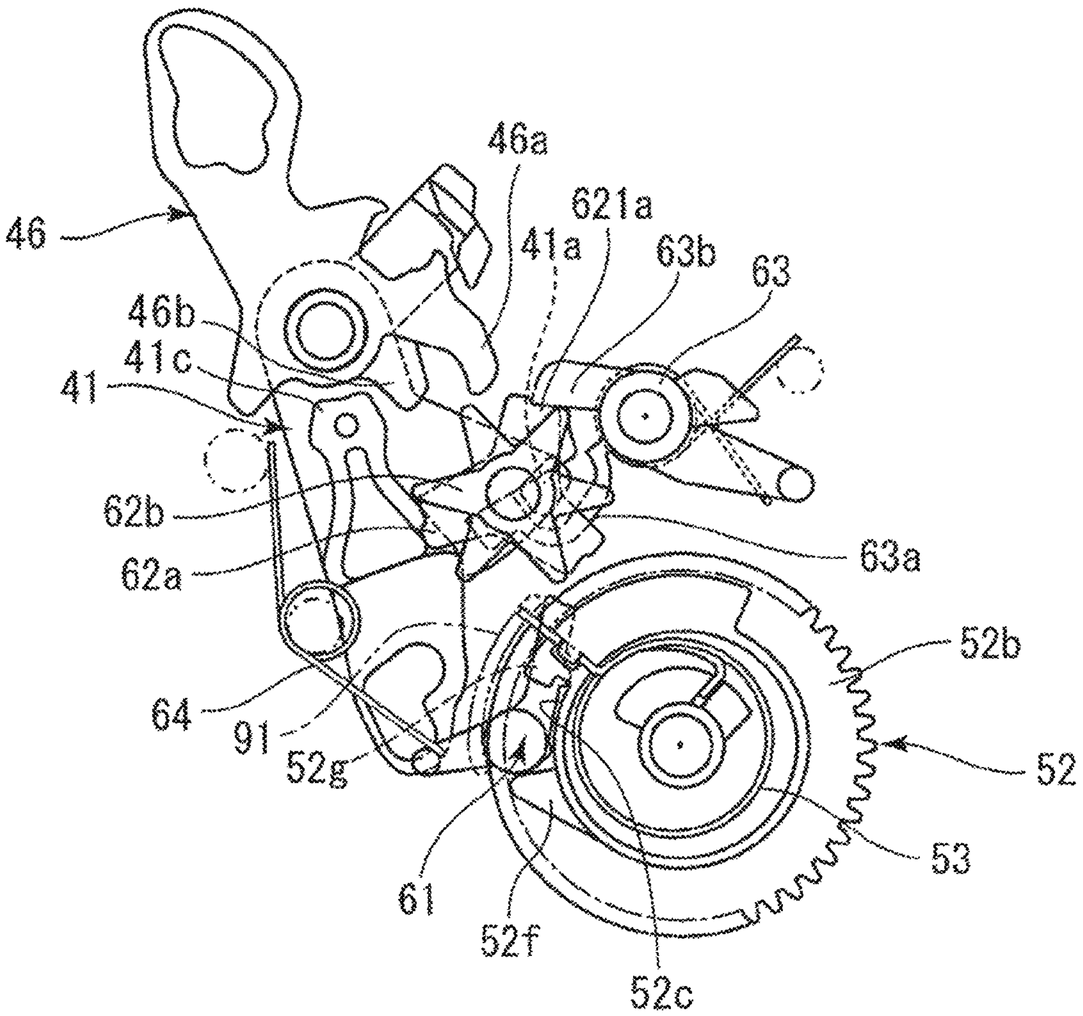

When or immediately after the rotation cam 52 rotates the integrally rotating first and second cam members 62*a*, 62*b* of the mechanical cam mechanism 62 by a predetermined angle (about 60 degrees in the present embodiment), the power supply to the first motor 51 stops, and the rotation cam 52 reverses to the first direction (the clockwise direction in FIG. 16 and FIG. 17(*a*)) by the biasing force of the spring 53 to return to the reference position as shown in FIG. 16 and FIGS. 17(*a*), (*b*). Accordingly, the transmission member 61 returns from the linkage position to the standby position. Since the first electric switching mechanism 6 includes the cooperation mechanism (52*f*, 61), the switching member (the switching lever) 63, and the mechanical cam mechanism 62 as described above, the locking/unlocking mechanism 4 and the rotation cam 52 can be brought close to each other so that the size of the device can be reduced.

When the rotation cam 52 rotates in the second direction, the switch lever 63 functioning as a locking/unlocking operation member engages with the first cam member 62*a* of the mechanical cam mechanism 62 which is pressed by the transmission member 61 to rotate by a predetermined angle, and pivots to switch from the locked position (the first position) to the unlocked position (the second position), or in the reverse direction. When the rotation cam 52 which has returned to the reference position rotates again in the second direction, the switch lever 63 switches to pivot in the reverse direction opposite to the previous pivoting.

When the switch lever 63 is in the unlocked position (the second position) as shown in FIGS. 4 to 7 and 22, the acting portion 63*a* is separated from the input portion 41*a* of the lock lever 41 and the abutting arm 63*b* engages with one of the inter-tooth recess portions 622*a* of the engagement teeth 620*a* of the first cam member 62*a*. The switch lever 63 is biased in the direction of engagement with the first cam member 62*a* (the clockwise direction in FIGS. 4 and 13) by the biasing force of the spring 65, but this biasing force acts as a force to return the first cam member 62*a* in a counter-rotation direction opposite to a rotation direction (the clockwise direction in FIGS. 4 and 13) in which the first cam member 62*a* makes the switching lever 63 pivot in the state where the abutting arm 63*b* engages with the inter-tooth recess portion 622*a*. However, since each of the inter-tooth recess portions 622*a* is formed with the second step portion 623*a* (see FIG. 10) as a detent, a sliding contact of the abutting arm 63*b* on each of the inter-tooth recess portions 622*a* can be locked. Therefore, the first cam member 62*a* is not returned in the counter-rotation direction by the switch lever 63.

When the rotation cam 52 rotates in the second direction in the state where the switch lever 63 is in the unlocked position (the second position), the transmission member 61 pressed by the operation portion 52*f* moves from the standby position to the linkage position and presses one of the engagement teeth 620*b* of the second cam member 62*b* to integrally rotate the first and second cam members 62*a*, 62*b* (see FIGS. 14 to 16). The rotating first cam member 62*a* lifts the abutting arm 63*b* of the switch lever 63 and slides it on the inter-tooth recess portion 622*a* to make it abut against the tip portion of one of the engagement teeth 620*b* (see FIGS. 14 to 15). When the first cam member 62*a* rotates by a predetermined angle (approximately 60 degrees in the present embodiment) to the locked position (the first position) where the switching lever 63 abuts against the first step portion 621*a* (see FIG. 16), the power supply to the first motor 51 stops, and the rotation cam 52 reverses in the first direction (the clockwise direction in FIGS. 16, 17(*a*)) to return to the reference position by the biasing force of the spring 53 as shown in FIGS. 16 and 17(*a*), (*b*). Accordingly, the transmission member 61 returns from the linkage position to the standby position.

When the switch lever 63 is in the locked position (the first position) as shown in FIGS. 17(*a*), (*b*), the acting portion 63*a* abuts against the input portion 41*a* (see FIG. 6) of the locking lever 41 from below, and the abutting arm 63*b* engages with the first step portion 621*a* of one of the engagement teeth 620*a* of the first cam member 62*a*. As described above, the biasing force of the spring 65 of the switching lever 63 acts as the force to return the first cam member 62*a* in the counter-rotation direction in the state where the abutting arm 63*b* engages with the first step portion 621*a*. However, since the tip portion of each of the engagement teeth 620*a* is formed with the first step portion 621*a* (see FIG. 10) as a detent, a sliding contact of the abutting arm 63*b* on the tip portion of each of the engagement teeth 620*a* can be locked. Therefore, the first cam member 62*a* is not returned in the counter-rotation direction by the switch lever 63.

Figure 18:
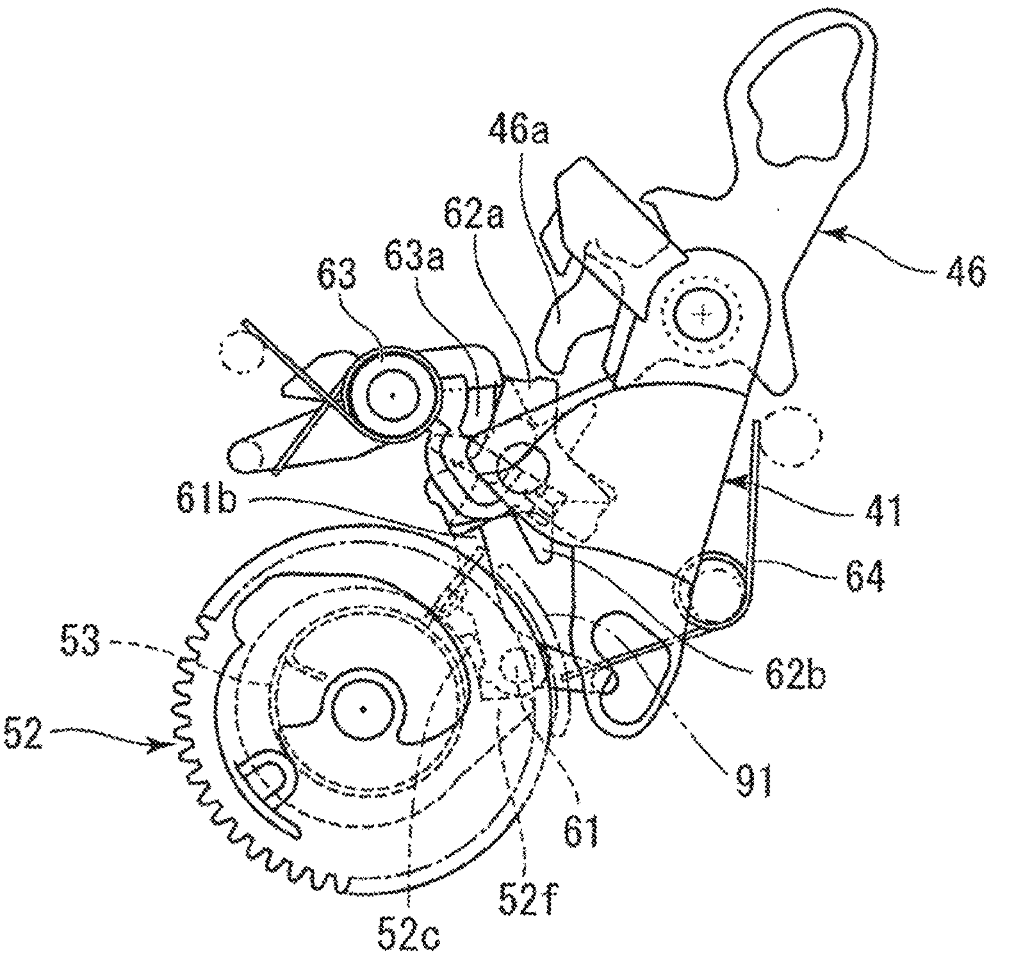
FIG. 18 is a front elevational view showing the principal part in a state where the rotation member of the principal part is rotating in the backward direction from the reference position from the double lock state to the non-double lock state.
Figure 19:
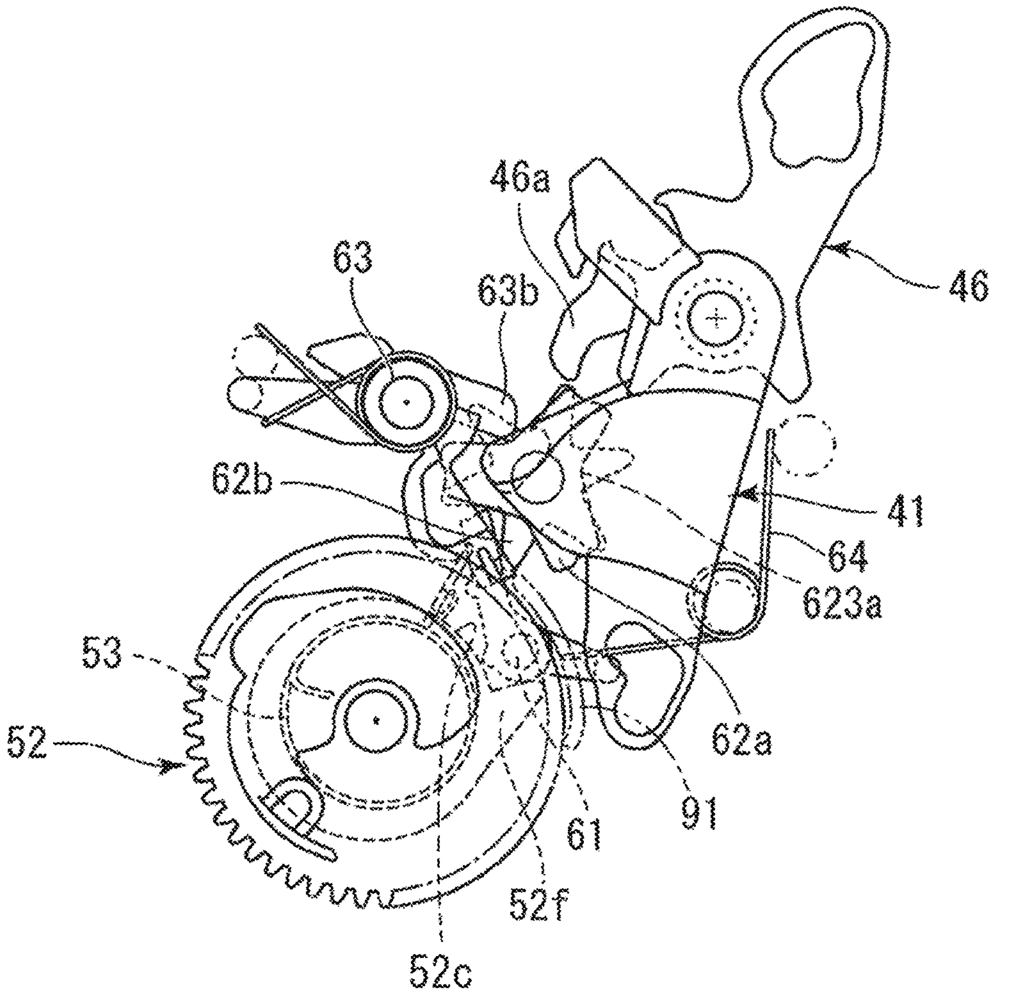
FIG. 19 is a front elevational view showing the principal part when the rotation of the rotation member in the backward direction is stopped.

When the rotation cam 52 rotates in the second direction in the state where the switch lever 63 is in the locked position (the first position), the transmission member 61 pressed by the operation portion 52*f* moves from the standby position to the linkage position and presses one of the engagement teeth 620*b* of the second cam member 62*b* to integrally rotate the first and second cam members 62*a*, 62*b* (see FIGS. 18, 19). The abutting arm 63*b* of the switch lever 63 disengages from the first step portion 621*a* (see FIG. 18) by the rotation of the first cam member 62*a*, slides on the inter-tooth recess portion 622*a* (see FIG. 19), and then engages with the second step portion 623*a* of one of the inter-tooth recess portions 622*a*. When the first cam member 62*a* rotates by a predetermined angle (about 60 degrees in the present embodiment) to the unlocked position (the second position) where the switch lever 63 engages with the second step portion 623*a*, the power supply to the first motor 51 stops, and the rotation cam 52 reverses in the first direction to return to the reference position by the biasing force of the spring 53. Accordingly, the transmission member 61 returns from the linkage position to the standby position (see FIG. 4). As described above, since the first step portion 621*a* is respectively provided on all of the engagement teeth 620*a* of the first cam member 62*a* and the second step portion 623*a* is respectively provided on all of the inter-tooth concave portions 622*a*, all of the first step portions 621 a provided at three positions in the present embodiment similarly act on the switching lever 63 respectively and all of the second step portions 623*a* provided at three positions in the present embodiment similarly act on the switching lever 63 respectively.

Figure 20:
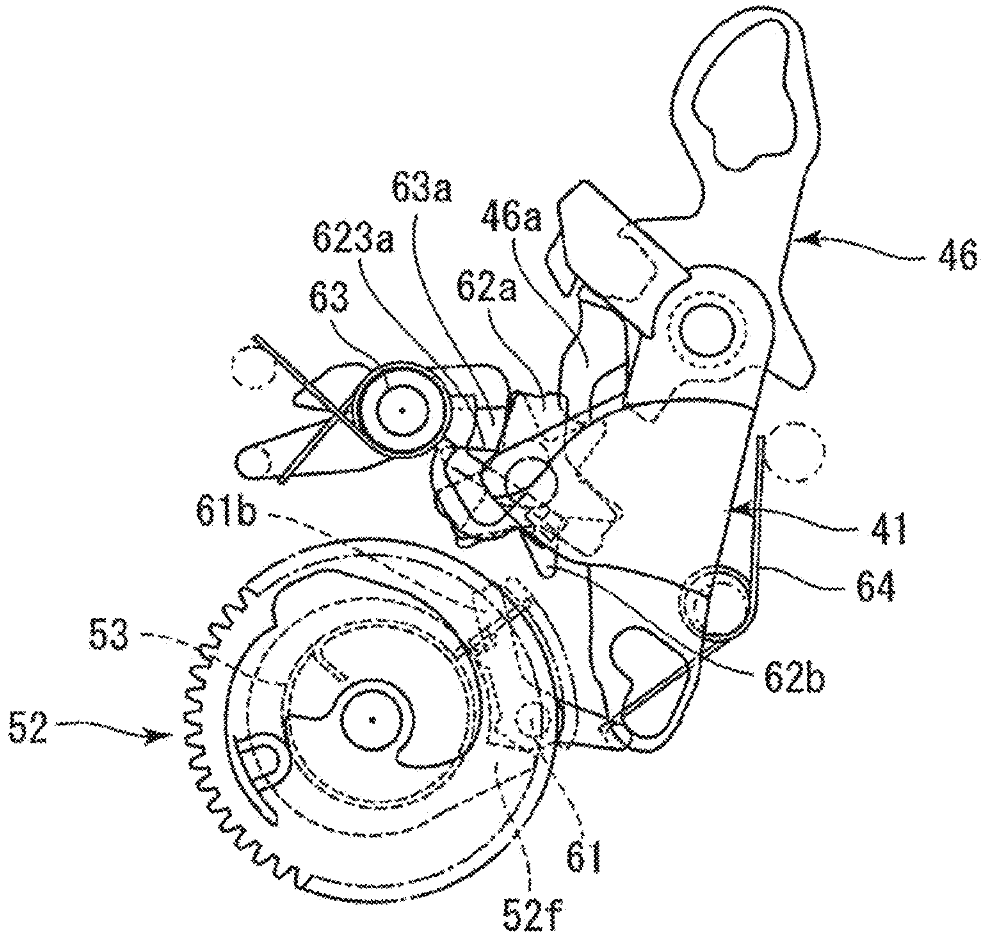
FIG. 20 is a front elevational view showing the principal part in a state where the locking/unlocking mechanism is being switched by using a key from the double locked state to the unlocked state.
Figure 21:
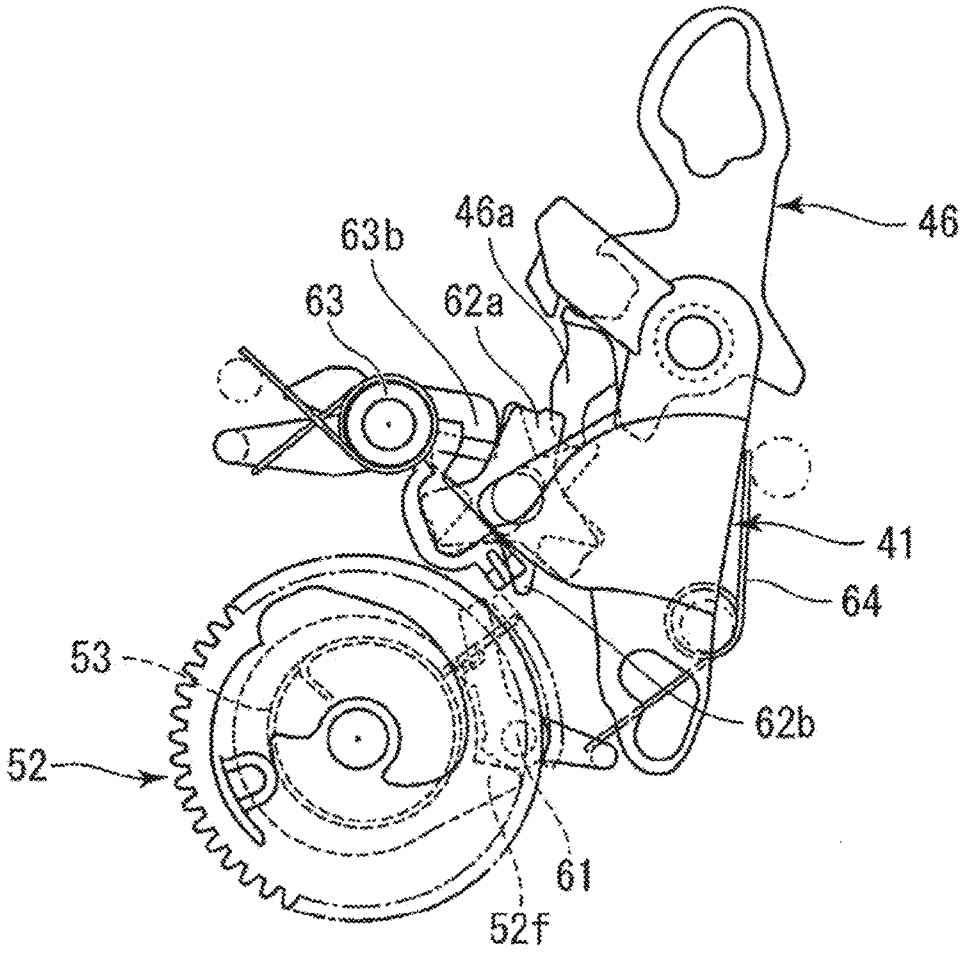
FIG. 21 is a front elevational view showing the principal part in a state where the locking/unlocking mechanism of the principal part shown in FIG. 20 further approaches an unlocked position.
Figure 22:
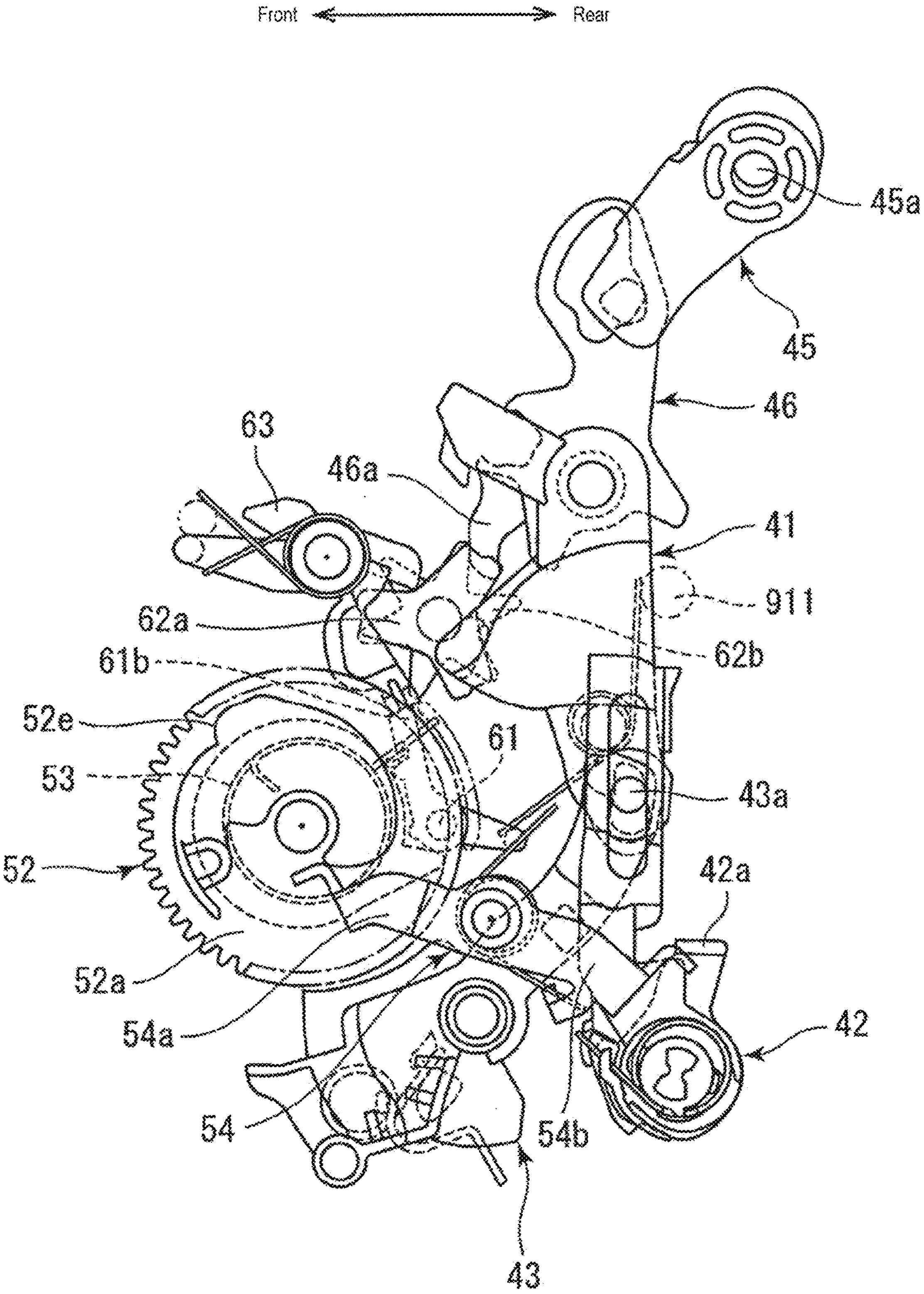
FIG. 22 is a front elevational view showing the principal part in the unlocked state of the vehicle door lock device shown in FIG. 1.

As shown in FIGS. 17(*a*), (*b*), when the key cylinder is made to pivot by the manual operation force by using the key in the state where the locking/unlocking mechanism 4 is in the locked state and the switch lever 63 is in the locked position (the first position), that is, in the state where the locking/unlocking mechanism 4 is in the double locked state, the sub-key lever 46 pivots along with the pivoting of the key lever 45 to shift the locking/unlocking mechanism 4 to the unlocked position (see FIG. 22). At this time, a claw portion 46*a* provided on the sub-key lever 46 presses one of the engagement teeth 620*b* of the second cam member 62*b* to integrally rotate the first and second cam members 62*a*, 62*b* (see FIGS. 20, 21). The abutting arm 63*b* of the switch lever 63 disengages from the first step portion 621*a* by the rotation of the first cam member 62*a* (see FIG. 20), slides on the inter-tooth recess portion 622*a* (see FIG. 19), and engages with the second step portion 623*a* of one of the inter-tooth recess portions 622*a* (see FIG. 10). Further, an abutting portion 46*b* of the sub-key lever 46 abuts against the engagement portion 41*c* of the locking lever 41 by the pivoting of the sub-key lever 46 to shift the locking lever 41 to the unlocked position and to shift the active lever 43 and the open link 42 to the unlocked state respectively. Thus, the locking/unlocking mechanism 4 is shifted to the unlocked position, and the switch lever 63 is returned to the unlocked position (the second position). In this way, by using the key, the locking/unlocking mechanism 4 can be shifted from the double locked state to the non-double locked state, and can also be shifted from the locked state to the unlocked state. As described above, the operation of the locking/unlocking mechanism 4 by using the key is not performed basically unless an emergency situation occurs.

The second electrical switching mechanism 7 comprises the second driving actuator (the second motor) 71, the sector gear 72 pivotally supported to the housing 9 by a pivot shaft 909 oriented to the vehicle interior-exterior direction, and a coupling rod 73 pivotally supported by a coupling shaft 72*a* on an end portion of the sector gear 72 and a coupling portion 43*b* on a lower portion of the active lever 43 respectively.

The sector gear 72 pivots in a forward direction (the clockwise direction in FIG. 2) by the forward rotation of the second motor 71, and pivots in a backward direction (the counterclockwise direction in FIG. 2) by the backward rotation of the second motor 71. Accordingly, the coupling rod 73 moves the active lever 43 from the locked position to the unlocked position and in the reverse direction against the biasing force of the spring 44, thereby shifting the locking/unlocking mechanism 4 from the locked state to the unlocked state and in the reverse direction.

The operation of the vehicle door lock device 1 is explained below. As noted above, it should be understood that the following description also serves as a description of the operation of the actuator device of the present invention.

In a Case Where the Door is Opened by the First Electric Switching Mechanism 6 Regardless of the State of the Locking/Unlocking Mechanism 4

By rotating the rotation cam 52 in the first direction from the reference position to make the open lever 54 pivot, it is capable of opening the door regardless of the state of the locking/unlocking mechanism 4, that is, regardless of whether the locking/unlocking mechanism 4 is in the locked state, the unlocked state, the double locked state, or the non-double locked state.

For example, in a case where the locking/unlocking mechanism 4 is in the locked state but in the non-double locked state as shown in FIGS. 4 to 7, when the first motor 51 is driven to rotate the rotation cam 52 in the first direction (the clockwise direction) by a predetermined angle (about 180 degrees in the present embodiment) from the reference position (see FIG. 4) against the biasing force of the spring 53 until the distal end portion 520*e* of the cam portion 52*e* abuts against the first arm portion 54*a* of the open lever 54, the arc surface of the cam portion 52*e* comes into contact with the first arm portion 54*a* of the open lever 54 from above to push down the first arm portion 54*a* and to make the open lever 54 pivot in the counterclockwise direction from the reference position as shown in FIG. 8. As a result, the second arm portion 54*b* of the open lever 54 abuts against the arm portion 23*a* of the ratchet lever 23 from below to make the ratchet 22 pivot in the release direction to bring the engagement mechanism 2 into the unlatched state, thereby enabling the opening operation of the door.

When or immediately after the rotation cam 52 rotates by the above-described predetermined angle until the rotation cam 52 pushes down the first arm portion 54*a* of the open lever 54, the power supply to the first motor 51 stops, and the rotation cam 52 reverses to the second direction (the counterclockwise direction in FIG. 8) by the biasing force of the spring 53 to return to the reference position. The open lever 54 returns to the reference position thereof by the biasing force of the spring 55 as the rotation cam 52 rotates to return to the reference position thereof.

In this way, the open lever 54 can operate the ratchet lever 23 independently of the open link 42. Therefore, when the open lever 54 is made to pivot by rotating the rotation cam 52 in the first direction from the reference position, the door can be opened even when the locking/unlocking mechanism 4 is in the double locked state, that is, the locking/unlocking mechanism 4 is in the state of being held in the locked position.

In a Case Where the Locking/Unlocking Mechanism 4 in the Locked State is Switched to the Double Locked State As shown in FIGS. 4 to 7, when the locking/unlocking mechanism 4 is in the locked state but in the non-double locked state, the switch lever 63 is in the unlocked position (the second position), the acting portion 63*a* is separated from the input portion 41*a* of the locking lever 41, the abutting arm 63*b* is engaged with the second step portion 623*a* (see FIG. 10) of one of the tooth recess portions 622*a* of the first cam member 62*a*, and the transmission member 61 is in the standby position.

When the first motor 51 is driven to rotate the rotation cam 52 in the second direction (the counterclockwise direction in FIG. 13) from the reference position against the biasing force of the spring 53, the transmission member 61 is pressed by the operation portion 52*f* to move from the standby position shown in FIGS. 4, 5 to the linkage position shown in FIG. 15, and as shown in FIGS. 4, 14, and 15, the cam pressing portion 61*b* presses one of the engagement teeth 620*b* of the second cam member 62*b* of the mechanical cam mechanism 62 to integrally rotate the first and second cam members 62*a*, 62*b* (see FIGS. 14 to 16).

By the rotation of the first cam member 62*a*, the abutting arm 63*b* of the switch lever 63 is lifted, is made to slide on the inter-tooth recess portion 622*a*, and is made to abut against the tip portion of one of the engagement teeth 620*b* (see FIGS. 14 to 15). Then, when the first cam member 62*a* rotates to a predetermined angle (about 60 degrees in the present embodiment), it moves the switch lever 63 to the locked position (the first position) to make the abutting arm 63*b* abut against the first step portion 621*a* of the tip portion (see FIG. 16). When the abutting arm 63*b* engages with the first step portion 621*a*, the first cam member 62*a* is not returned in the counter-rotation direction by the switch lever 63 as described above.

When the switch lever 63 pivots to the locked position (the first position), as shown in FIGS. 17(*a*), (*b*), the acting portion 63*a* abuts against the input portion 41*a* (see FIG. 6) of the locking lever 41 from below to be capable of making the locking/unlocking mechanism 4 in the double locked state.

When or immediately after the locking/unlocking mechanism 4 is made to be in the double locked state as described above, the power supply to the first motor 51 stops, and the rotation cam 52 reverses to the first direction (the clockwise direction in FIG. 16 and FIG. 17(*a*)) by the biasing force of the spring 53 to return to the reference position as shown in FIGS. 16 and 17(*a*), (*b*). Accordingly, the transmission member 61 returns to the standby position from the linkage position.

In a Case Where the Locking/Unlocking Mechanism 4 in the Double Locked State is Switched to the Non-Double Locked State As shown in FIGS. 17(*a*), (*b*), when the locking/unlocking mechanism 4 is in the locked state and the switch lever 63 is in the in the locked position (the first position), that is, when the locking/unlocking mechanism 4 is in the double locked state, the switch lever 63 is in the locked position (the first position), the acting portion 63*a* is engaged with the input portion 41*a* of the locking lever 41 and holds the locking lever 41 in the locked position to hold the locking/unlocking mechanism 4 in the double locked state, the abutting arm 63*b* is engaged with the first step portion 621*a* (see FIG. 10) of the first cam member 62*a*, and the transmission member 61 is in the standby position.

When the first motor 51 is driven to rotate the rotation cam 52 in the second direction (the counterclockwise direction in FIG. 13) from the reference position against the biasing force of the spring 53, the transmission member 61 is pressed by the operation portion 52*f* to move from the standby position to the linkage position, and the cam pressing portion 61*b* presses one of the engagement teeth 620*b* of the second cam member 62*b* of the mechanical cam mechanism 62 to integrally rotate the first and second cam members 62*a*, 62*b* (see FIGS. 18, 19).

By the rotation of the first cam member 62*a*, the abutting arm 63*b* of the switch lever 63 disengages from the first step portion 621*a* (see FIG. 18), and slides on the inter-tooth recess portion 622*a* (see FIG. 19). Then, when the first cam member 62*a* rotates to a predetermined angle (about 60 degrees in the present embodiment), the switch lever 63 pivots to the unlocked position (the second position), and the abutting arm 63*b* engages with the second step portion 623*a* of one of the inter-tooth recess portions 622*a*. When the abutting arm 63*b* engages with the second step portion 623*a*, the first cam member 62*a* is not returned in the counter-rotation direction by the switch lever 63 as described above.

When the switch lever 63 pivots to the unlocked position (the second position), the locking/unlocking mechanism 4 is released from the double locked state and is made to be in the non-double locked state but in the locked state as shown in FIGS. 4 to 7.

When or immediately after the locking/unlocking mechanism 4 is made to be in the non-double locked state as described above, the power supply to the first motor 51 stops, and the rotation cam 52 reverses to the first direction by the biasing force of the spring 53 to return to the reference position. Accordingly, the transmission member 61 returns to the standby position from the linkage position (see FIG. 4).

In a Case Where the Locking/Unlocking Mechanism 4 in the Double Locked State is Switched to the Unlocked State by Using the Key When the key cylinder is made to pivot by the manual operation force by using the key in the state where the locking/unlocking mechanism 4 is in the double locked state shown in FIG. 17(*a*), (*b*), the sub-key lever 46 pivots along with the pivoting of the key lever 45 to shift the locking/unlocking mechanism 4 to the unlocked position (see FIG. 22). At this time, the claw portion 46*a* provided on the sub-key lever 46 presses one of the engagement teeth 620*b* of the second cam member 62*b* to integrally rotate the first and second cam members 62*a*, 62*b* (see FIGS. 20, 21). The abutting arm 63*b* of the switch lever 63 disengages from the first step portion 621*a* by the rotation of the first cam member 62*a* (see FIG. 20), slides on the inter-tooth recess portion 622*a* (see FIG. 19), and engages with the second step portion 623*a* of one of the inter-tooth recess portions 622*a* (see FIG. 10). Further, the abutting portion 46*b* of the sub-key lever 46 abuts against the engagement portion 41*c* of the locking lever 41 by the pivoting of the sub-key lever 46 to shift the locking lever 41 to the unlocked position and to shift the active lever 43 and the open link 42 to the unlocked state respectively.

Thus, the locking/unlocking mechanism 4 is shifted to the unlocked position, and the switch lever 63 is returned to the unlocked position (the second position). In this way, by using the key, the locking/unlocking mechanism 4 can be shifted from the double locked state to the non-double locked state, and can also be shifted from the locked state to the unlocked state. As described above, the operation of the locking/unlocking mechanism 4 by using the key is not performed basically unless an emergency situation occurs.

In a Case Where the Locking/Unlocking Mechanism 4 in the Locked State is Switched to the Unlocked State In the state where the locking/unlocking mechanism 4 is in the locked state but in the non-double locked state, when the second motor 71 is driven to make the sector gear 72 pivot in the forward direction (the clockwise direction in FIG. 2) to pull the coupling rod 73 forward (see FIG. 2) and the active lever 43 is made to move from locked position to the unlocked position against the biasing force of the spring 44, it is capable of shifting the locking/unlocking mechanism 4 from the locked state to the unlocked state. Therefore, the second electrical switching mechanism 7 can quickly switch the locking/unlocking mechanism 4 from the locked state to the unlocked state in an emergency situation or the like. When the locked state is switched to the unlocked state by using the second electric switching mechanism 7, the actuation time of the driving actuator can be shortened, so that the NVH (Noise, Vibration, Harshness) of the vehicle can be reduced.

Moreover, when the key cylinder is made to pivot by the manual operation force by using the key, the sub-key lever 46 pivots along with the pivoting of the key lever 45, and it is capable of shifting the locking/unlocking mechanism 4 in the non-double locked state to the unlocked position.

In a Case Where the Locking/Unlocking Mechanism 4 in the Unlocked State is Switched to the Locked State In the state where the locking/unlocking mechanism 4 is in the unlocked state, when the second motor 71 is driven to make the sector gear 72 pivot in the backward direction to move the active lever 43 from the unlocked position to the locked position against the biasing force of the spring 44, it is capable of shifting the locking/unlocking mechanism 4 from the unlocked state to the locked state.

Moreover, when the key cylinder is made to pivot by the manual operation force by using the key, the sub-key lever 46 pivots along with the pivoting of the key lever 45, and it is capable of shifting the locking/unlocking mechanism 4 in the unlocked state to the locked position.

As described above, the actuator device of the present invention has the following advantages (1) to (5).

(1) Since by providing the configuration in which the first operation (the operation releasing the engagement of the engagement mechanism 2) is performed by the actuation of the two-way actuation member (the rotation cam) 52 in the first direction, and the second operation (the operation for the locking/unlocking mechanism 4) moving the switching member (the switch lever) 63 between the first and second positions is performed by the actuation of the two-way actuation member in the second direction, it is possible to perform only the operation on the first operation mechanism (the electric release mechanism) 5 in the actuation in the first direction and only the operation on the second operation mechanism (the first electric switching mechanism) 6 requiring the switching actuation in the actuation in the second direction, it is not necessary to separately perform the operation on the second operation mechanism (the first electric switching mechanism) 6 requiring the switching actuation, in the first and second directions, and thereby enabling the structure to be simplified and the device to be downsized.

(2) Since by providing the configuration in which the operation member (the open lever) 54 is disposed in the first rotational surface 52*a* side and the switching member (the switch lever) 63 is disposed in the second rotational surface 52*b* side, the first and second operations (the operation releasing the engagement of the engagement mechanism 2 and the operation for the locking/unlocking mechanism 4) can be performed by the single rotation member (the rotation cam) 52, and thereby enabling the structure to be simplified and the device to be downsized.

(3) Since by providing the configuration in which a part of the transmission member 61 is disposed to overlap the rotational surface 52*b* of the rotation member (the rotation cam) 52 to be supported by the operation portion 52*f* provided on the rotation member (the rotation cam) 52, it is not necessary to provide a structure for pivotally supporting the transmission member 61 by a shaft, and it is possible to provide a configuration in which the driving force of the driving actuator (the first motor) 51 is surely transmitted to the switching member by the transmission member 61 while simplifying the structure.

(4) Since by providing the configuration in which the transmission member 61 is disposed to overlap the rotation member (the rotation cam) 52, a target of the second operation (the locking/unlocking mechanism 4) and the rotation member (the rotation cam) 52 can be brought close to each other, and thereby enabling the device to be downsized.

(5) Since by providing the configuration in which each of the engagement teeth 620*b* of the second cam member 62*b* has a smaller tooth width than each of the engagement teeth 620*a* of the first cam member 620*a* and has a mountain shape in the rotational surface view, the transmission member 61 can move from the linkage position to the standby position without interfering with the second cam member 62*b* after pressing the second cam member 62*b*, and therefore, the first and second operations (the operation releasing the engagement of the engagement mechanism 2 and the operation for the locking/unlocking mechanism 4) can be realized in a space-saving manner and the device can be downsized.

Further, the vehicle door lock device of the present invention has the following advantages (1) to (6).

(1) Since by providing the configuration in which the operation releasing the engagement of the engagement mechanism 2 is performed by the actuation of the rotation member (the rotation cam) 52 in the first direction, and the operation moving the switching member (the switch lever) 63 between the first and second positions to switch the actuation state of the locking/unlocking mechanism 4 between the locked and unlocked states or to switch the shift of the actuation state of the locking/unlocking mechanism 4 between the ineffective and effective states is performed by the actuation of the rotation member (the rotation cam) 52 in the second direction, it is possible to perform only the operation on the engagement mechanism 2 in the actuation in the first direction and only the operation on the locking/unlocking mechanism 4 requiring the switching actuation in the actuation in the second direction, it is not necessary to separately perform the operation on the locking/unlocking mechanism 4 requiring the switching actuation, in the first and second directions, and thereby enabling the structure to be simplified and the device to be downsized.

(2) Since by providing the configuration in which the release member (the open lever) 54 is disposed in the first rotational surface 52*a* side and the locking/unlocking operation member (the switch lever) 63 is disposed in the second rotational surface 52*b* side, the operation for the engagement mechanism 2 and the operation for the locking/unlocking mechanism 4 can be performed by the single rotation member (the rotation cam) 52, and thereby enabling the structure to be simplified and the device to be downsized.

(3) Since by providing the configuration in which a part of the transmission member 61 is disposed to overlap the rotational surface 52*b* of the rotation member (the rotation cam) 52 to be supported by the operation portion 52*f* provided on the rotation member (the rotation cam) 52, it is not necessary to provide a structure for pivotally supporting the transmission member 61 by a shaft, and it is possible to provide a configuration in which the driving force of the driving actuator (the first motor) 51 is surely transmitted to the switching member by the transmission member 61 while simplifying the structure.

(4) Since by providing the configuration in which the transmission member 61 is disposed to overlap the rotation member (the rotation cam) 52, the locking/unlocking mechanism 4 and the rotation member (the rotation cam) 52 can be brought close to each other, and thereby enabling the device to be downsized.

(5) Since by providing the configuration in which each of the engagement teeth 620*b* of the second cam member 62*b* has a smaller tooth width than each of the engagement teeth 620*a* of the first cam member 620*a* and has a mountain shape in the rotational surface view, the transmission member 61 can move from the linkage position to the standby position without interfering with the second cam member 62*b* after pressing the second cam member 62*b*, and therefore, the operation for the engagement mechanism 2 and the operation for the locking/unlocking mechanism 4 can be realized in a space-saving manner and the device can be downsized.

(6) By using the second electrical switching mechanism 7, the locking/unlocking mechanism 4 can be quickly switched from the locked state to the unlocked state in an emergency situation or the like and the actuation time of the driving actuator when the locked state is quickly switched to the unlocked state can be shortened, and therefore the NVH (Noise, Vibration, Harshness) of the vehicle can be reduced.

As described above, one embodiment of the present invention is explained in detail by referring to the drawings, but the present invention is not limited to the above one embodiment and various changes and modifications may be added to the present embodiment without departing from the gist of the present invention. For example, in the above-described embodiment, the first electric switching mechanism 6 is described as a mechanism for switching between the double locked state in which the locked state of the locking/unlocking mechanism 4 is held and the non-double locked state in which the locked state of the locking/unlocking mechanism 4 is not held by the electromotive power, but the configuration of the first electric switching mechanism 6 can also be applied as a mechanism for switching between the locked state and the unlocked state of the locking/unlocking mechanism 4.

Further, in the above-described embodiment, an example in which the actuator device of the present invention is applied to a vehicle door lock device has been described, but the actuator device of the present invention can also be applied to an actuator device of other devices.

What is claimed is:

1. An actuator device acting in two directions by a single driving actuator, comprising:

a two-way actuation member that acts in first and second different directions respectively against a biasing force of a return biasing member, by a motive power of the driving actuator, with a neutral position where the two-way actuation member is held by the return biasing member as a reference position, a first operation mechanism that performs a first operation by the actuation of the two-way actuating member in the first direction, and a second operation mechanism that performs a second operation different from the first operation by the actuation of the two-way actuating member in the second direction, the second operation mechanism including a cooperation mechanism that acts by the actuation of the two-way operation member and a switching member that moves between first and second different positions by transmitting of the actuation of the cooperation mechanism, wherein when the two-way actuation member actuates the first operation mechanism, the two-way actuation member acts in the first direction from the reference position against the biasing force of the return biasing member, by the motive power of the driving actuator, to actuate the first operation mechanism, and then acts to return to the reference position by the biasing force of the return biasing member, and wherein when the two-way actuation member actuates the second operation mechanism, the two-way actuation member performs the following first and second switching operations:

the first switching operation in which the two-way actuation member acts in the second direction from the reference position against the biasing force of the return biasing member, by the motive power of the driving actuator, to switch the switching member from the first position to the second position via the cooperation mechanism, then acts to return to the reference position by the biasing force of the return biasing member, and the second switching operation in which the two-way actuation member acts in the second direction from the reference position against the biasing force of the return biasing member, by the motive power of the driving actuator, to switch the switching member from the second position to the first position via the cooperation mechanism, then acts to return to the reference position by the biasing force of the return biasing member, thereby switching the switching member between the first and second positions.

2. The actuator device according to claim 1, wherein the two-way actuation member is a rotation member supported by a rotation shaft to be configured to rotate in each of a first rotation direction that is either one of forward and backward directions and a second rotation direction that is opposite to the first rotation direction, from the reference position, against the biasing force of the return biasing member, by the motive power of the driving actuator, wherein the first operation mechanism is provided with an operation member performing the first operation, the operation member being pivotably supported by a pivot shaft and pivoting by pressing with a cam portion provided on the rotation member when the rotation member rotates in the first rotation direction, wherein the cooperation mechanism of the second operation mechanism acts by the rotation in the second rotation direction of the rotation member and comprises an operation portion provided on the rotation member and a transmission member that is configured to engage with or disengage from the operation portion, the transmission member moving from a standby position to a linkage position when the rotation member rotates in the second rotation direction and moving from the linkage position to the standby position when the rotation member returns to the reference position, and wherein when the second operation mechanism is actuated, the rotation member performs the following first and second switching operations:

the first switching operation in which the rotation member rotates in the second rotation direction from the reference position and moves the transmission member from the standby position to the linkage position by the operation portion to switch the switching member from the first position to the second position, then returns to the reference position by the biasing force of the return biasing member, and the second switching operation in which the rotation member rotates in the second rotation direction from the reference position and moves the transmission member from the linkage position to the standby position by the operation portion to switch the switching member from the second position to the first position, then returns to the reference position by the biasing force of the return biasing member, thereby switching the switching member between the first and second positions.

3. The actuator device according to claim 2, wherein the cam portion is provided on a first rotational surface that is one rotational surface of the rotation member, and the operation member is disposed in the first rotational surface side of the rotation member, and wherein the operation portion is provided on a second rotational surface that is the other rotational surface of the rotation member, the transmission member is disposed such that a part of the transmission member overlaps the second rotational surface to be configured to engage with or disengage from the operation portion, and the switching member is disposed in the second rotational surface side.

4. The actuator device according to claim 2, wherein the second operation mechanism has a mechanical cam mechanism comprising gear-shaped first and second cam members that are coaxially provided to integrally rotate, the mechanical cam mechanism being provided between the cooperation mechanism and the switching member, wherein the first cam member has a plurality of engagement teeth that extend radially outward from a rotation center thereof, and the plurality of engagement teeth sequentially mesh with an engaged portion provided on the switching member in accordance with the rotation of the first cam member to move the switching member between the first and second positions, and wherein the second cam member has a plurality of engagement teeth radially extending outward from a rotation center thereof, the plurality of engagement teeth are spaced apart from the transmission member when the transmission member is in the standby position, and are configured to be engaged with and pressed by a cam pressing portion provided on the transmission member to integrally rotate the first and second cam members when the transmission member moves from the standby position to the linkage position.

5. The actuator device according to claim 4, wherein each engagement tooth of the first cam member has a tongue piece shape in a rotational surface view, a tip portion of each of the engagement teeth is formed with a first step portion for locking the engaged portion of the switching member, and a bottom portion of each inter-tooth recess portion of the first cam member is formed with a second step portion for locking the engaged portion of the switching member, and wherein each engagement tooth of the second cam member has a mountain shape in a rotational surface view and has a smaller tooth width than each of the engagement teeth of the first cam member, the number of teeth of the second cam member is twice the number of teeth of the first cam member, and the first and second cam members are arranged in an overlapping manner such that the alternately formed engagement teeth and inter-tooth recesses of the first cam member are alternately arranged with respect to the plurality of engagement teeth of the second cam member.

6. A vehicle door lock device comprising the actuator device according to claim 1, comprising:

an engagement mechanism holding a door in a closed position by engaging with a striker provided on a vehicle body of a vehicle, a manual release mechanism releasing the engagement of the engagement mechanism by a manual operation force, and a locking/unlocking mechanism in which an actuation state is switched between a locked state in which an actuation of the manual release mechanism cannot be transmitted to the engagement mechanism such that the engagement of the engagement mechanism cannot be released and an unlocked state in which the actuation of the manual release mechanism can be transmitted to the engagement mechanism such that the engagement of the meshing mechanism can be released, wherein an electric release mechanism releasing the engagement of the engagement mechanism by the motive power of the driving actuator is provided as the first operation mechanism of the actuator device, wherein an electric switching mechanism activated by the motive power of the driving actuator common to the electric release mechanism is provided as the second operation mechanism of the actuator device, the electric switching mechanism having a first switching function to switch the actuation state of the locking/unlocking mechanism between the locked and unlocked states or a second switching function to switch the actuation state of the locking/unlocking mechanism between ineffective and effective states, wherein the electric release mechanism and the electric switching mechanism are provided with a rotation member that is common to both of the mechanisms as the two-way actuation member of the actuator device, the rotation member being supported by a rotation shaft to be configured to rotate in each of a first rotation direction that is either one of forward and backward directions and a second rotation direction that is opposite to the first rotation direction, from the reference position, against the biasing force of the return biasing member, by the motive power of the driving actuator, wherein the electric switching mechanism has a cooperation mechanism acting by the rotation of the rotation member in the second rotation direction as the cooperation mechanism of the actuator device, and has a switching member moving between first and second different positions by transmitting of the actuation of the cooperation mechanism as the switching member of the actuator device, wherein when the electric release mechanism is activated, the rotation member acts to rotate in the first rotation direction against the biasing force of the return biasing member, by the motive power of the driving actuator, to release the engagement of the engagement mechanism, and then acts to return to the reference position by the biasing force of the return biasing member, and wherein when the electric switching mechanism is activated, the rotation member performs the following first and second switching operations:

the first switching operation in which the rotation member acts to rotate in the second direction from the reference position against the biasing force of the return biasing member, by the motive power of the driving actuator, to switch the switching member from the first position to the second position via the cooperation mechanism, then acts to return to the reference position by the biasing force of the return biasing member, and the second switching operation in which the rotation member acts to rotate in the second direction from the reference position against the biasing force of the return biasing member, by the motive power of the driving actuator, to switch the switching member from the second position to the first position via the cooperation mechanism, then acts to return to the reference position by the biasing force of the return biasing member, thereby switching the actuation state of the locking/unlocking mechanism between the locked and unlocked states or switching a shift of the actuation state of the locking/unlocking mechanism between the ineffective and effective states, by switching the switching member between the first and second positions.

7. The vehicle door lock device according to claim 6, wherein the electric release mechanism has a release member rotating by pressing with a cam portion provided on the rotation member when the rotation member rotates in the first direction to release the engagement of the engagement mechanism, wherein the cooperation mechanism of the electric switching mechanism comprises an operation portion provided on the rotation member and a transmission member that is configured to engage with or disengage from the operation portion, the transmission member moving from a standby position to a linkage position when the rotation member rotates in the second rotation direction and moving from the linkage position to the standby position when the rotation member returns to the reference position, and wherein the switching member of the electric switching mechanism is a locking/unlocking operation member pivoting between locked and unlocked positions in which the locking/unlocking mechanism is held in the locked and unlocked states respectively by the movement of the transmission member between the standby position and the linkage position when the electric switching mechanism has the first switching function, or another locking/unlocking operation member pivoting between locked and unlocked positions in which the switching of the actuation state of the locking/unlocking mechanism is ineffective and effective respectively by the movement of the transmission member between the standby position and the linkage position when the electric switching mechanism has the second switching function.

8. The vehicle door lock device according to claim 7, wherein the cam portion is provided on a first rotational surface that is one rotational surface of the rotation member, and the release member is disposed in the first rotational surface side of the rotation member, and wherein the operation portion is provided on a second rotational surface which is the other rotational surface of the rotation member, the transmission member is configured to engage with or disengage from the operation portion by being disposed such that a part of the transmission member overlaps the second rotational surface, and the locking/unlocking operation member is disposed in the second rotational surface side.

9. The vehicle door lock device according to claim 8, wherein the second rotational surface of the rotation member faces an inner surface of a housing that accommodates the locking/unlocking mechanism, the electric release mechanism, and the electric switching mechanism, a wall portion protruding perpendicularly from the second rotational surface is provided on the rotation member, a guide wall is provided on the inner surface of the housing, and a guide groove is formed on the inner surface of the housing between the wall portion and the guide wall, wherein the transmission member is provided with a biasing portion supporting a hold biasing member and a sliding portion abutting against the guide groove of the housing, the biasing portion being pressed by the hold biasing member such that a central portion of the transmission member abuts against the operation portion, and wherein the transmission member is disposed between the wall portion and the guide wall to be configured to engage with and disengage from the operation portion, is pushed by the operation portion to move from the standby position to the linkage position while sliding in contact with the guide groove of the housing and the second rotational surface of the rotation member when the rotation member rotates in the second direction, and is configured such that a cam pressing portion provided on the transmission member protrudes from between the wall portion and the guide wall as the transmission member approaches the linkage position.

10. The vehicle door lock device according to claim 9, wherein the guide wall of the housing is provided along an outer circumference of the rotation member, wherein the transmission member is provided with a sliding portion abutting against the wall portion and another sliding portion abutting against the guide wall, wherein the holding biasing member is configured to press the transmission member toward the operating portion such that the transmission member moves along the guide wall, and wherein when the transmission member is in the standby position, the transmission member abuts against the wall portion and the guide wall, and when the rotation member rotates in the second direction, the transmission member is pressed by the operation portion to move from the standby position to the linkage position while sliding contact with the guide groove of the housing and the second rotational surface of the rotation member and while sliding contact with the guide wall.

11. The vehicle door lock device according to claim 7, wherein the electric switching mechanism has a mechanical cam mechanism comprising gear-shaped first and second cam members that are coaxially provided to integrally rotate, the mechanical cam mechanism being provided between the cooperation mechanism and the switching member, wherein the first cam member has a plurality of engagement teeth that extend radially outward from a rotation center thereof, and the plurality of engagement teeth sequentially mesh with an engaged portion provided on the switching member in accordance with the rotation of the first cam member to move the switching member between the locked and unlocked positions, and wherein the second cam member has a plurality of engagement teeth radially extending outward from a rotation center thereof, the plurality of engagement teeth are spaced apart from the transmission member when the transmission member is in the standby position, and are configured to be engaged with and pressed by a cam pressing portion provided on the transmission member to integrally rotate the first and second cam members when the transmission member moves from the standby position to the linkage position.

12. The vehicle door lock device according to claim 11, wherein each engagement tooth of the first cam member has a tongue piece shape in a rotational surface view, a tip portion of each of the engagement teeth is formed with a first step portion for locking the engaged portion of the switching member, and a bottom portion of each inter-tooth recess portion of the first cam member is formed with a second step portion for locking the engaged portion of the switching member, and wherein each engagement tooth of the second cam member has a mountain shape in a rotational surface view and has a smaller tooth width than each of the engagement teeth of the first cam member, the number of teeth of the second cam member is twice the number of teeth of the first cam member, and the first and second cam members are arranged in an overlapping manner such that the alternately formed engagement teeth and inter-tooth recesses of the first cam member are alternately arranged with respect to the plurality of engagement teeth of the second cam member.

13. The vehicle door lock device according to claim 7, wherein the electric switching mechanism has a function of switching between double locked and non-double locked states in which the locked state of the locking/unlocking mechanism is held and is not held respectively, as the second switching function, and wherein the switching member is a locking/unlocking operation member that rotates between locked and unlocked positions in which the locking/unlocking mechanism is held in the double locked and non-double locked states respectively by the movement of the transmission member between the standby position and the linkage position.

14. The vehicle door lock device according to claim 6, wherein the electric switching mechanism has a function of switching between double locked and non-double locked states in which the locked state of the locking/unlocking mechanism is held and is not held respectively, as the second switching function, thereby switching between the double locked and non-double locked states of the locking/unlocking mechanism by switching the switching member between the first and second positions when the electric switching mechanism is actuated.

15. The vehicle door lock device according to claim 6, wherein the electric switching mechanism has a function of switching between double locked and non-double locked states in which the locked state of the locking/unlocking mechanism is held and is not held respectively, as the second switching function, and wherein the vehicle door lock device is provided with another electric switching mechanism that has the first switching function and comprises another driving actuator separate from the driving actuator.

16. The vehicle door lock device according to claim 15, wherein the locking/unlocking mechanism is configured to be switched between the locked and unlocked states by said another electric switching mechanism.

* * * * *